(12) United States Patent
Cohen et al.

(10) Patent No.: US 9,201,774 B1
(45) Date of Patent: Dec. 1, 2015

(54) GENERATING TEST SCENARIO TEMPLATES FROM TESTING DATA OF DIFFERENT ORGANIZATIONS UTILIZING SIMILAR ERP MODULES

(71) Applicant: Panaya Ltd., Raanana (IL)

(72) Inventors: Yossi Cohen, Raanana (IL); Mati Cohen, Raanana (IL); Nurit Dor, Raanana (IL); Dror Weiss, Raanana (IL)

(73) Assignee: Panaya Ltd., Raanana (IL)

( * ) Notice: Subject to any disclaimer, the term of this patent is extended or adjusted under 35 U.S.C. 154(b) by 0 days.

(21) Appl. No.: 14/141,726

(22) Filed: Dec. 27, 2013

Related U.S. Application Data

(63) Continuation-in-part of application No. 13/103,078, filed on May 8, 2011, now Pat. No. 8,739,128.

(60) Provisional application No. 61/747,313, filed on Dec. 30, 2012, provisional application No. 61/814,305, filed on Apr. 21, 2013, provisional application No. 61/919,773, filed on Dec. 22, 2013.

(51) Int. Cl.
  *G06F 9/445* (2006.01)
  *G06F 11/36* (2006.01)

(52) U.S. Cl.
  CPC ........ *G06F 11/3684* (2013.01); *G06F 11/3604* (2013.01); *G06F 9/44589* (2013.01); *G06F 11/36* (2013.01)

(58) Field of Classification Search
  None
  See application file for complete search history.

(56) References Cited

U.S. PATENT DOCUMENTS

| | | | |
|---|---|---|---|
| 5,544,310 A * | 8/1996 | Forman et al. | 714/31 |
| 5,629,878 A | 5/1997 | Kobrosly | |
| 5,781,720 A * | 7/1998 | Parker et al. | 714/38.11 |
| 5,905,856 A * | 5/1999 | Ottensooser | 714/38.1 |
| 6,360,332 B1 * | 3/2002 | Weinberg et al. | 714/4.1 |
| 6,546,523 B1 * | 4/2003 | Boorananut et al. | 716/56 |
| 6,810,494 B2 | 10/2004 | Weinberg et al. | |
| 6,865,692 B2 | 3/2005 | Friedman et al. | |
| 6,898,784 B1 | 5/2005 | Kossatchev et al. | |
| 7,032,212 B2 * | 4/2006 | Amir et al. | 717/124 |
| 7,191,435 B2 * | 3/2007 | Lau et al. | 717/168 |
| 7,475,289 B2 * | 1/2009 | Rosaria et al. | 714/38.1 |

(Continued)

OTHER PUBLICATIONS

Sreedevi Sampath, A Scalable Approach to User-session based Testing of Web Applications through Concept Analysis, 2004.

(Continued)

*Primary Examiner* — Isaac T Tecklu
(74) *Attorney, Agent, or Firm* — Active Knowledge Ltd.

(57) ABSTRACT

System, method, and non-transitory medium for generating a test scenario template from data collected from users running test scenarios to test vendor-customized packaged application modules. Analysis by a module analyzer of descriptions of vendor-customized packaged application modules is utilized to identify similar customizations to the modules. Additionally, a component analyzer identifies, based on the similar customizations, similar components in the modules. Given a specific run of a test scenario run to test a second instance of a certain module, and a description of similar components that include an indication of at least one component of the second instance that is similar to at least one component of a first instance of the certain module, a template generator may generate a test scenario template for testing the first instance. A data cleaner may be used to remove from the generated test scenario template proprietary data.

20 Claims, 8 Drawing Sheets

(56) References Cited

U.S. PATENT DOCUMENTS

| | | | |
|---|---|---|---|
| 7,490,319 B2* | 2/2009 | Blackwell et al. | 717/124 |
| 7,506,211 B2* | 3/2009 | Apostoloiu et al. | 714/38.14 |
| 7,512,839 B2* | 3/2009 | Coulter et al. | 714/30 |
| 7,516,440 B2* | 4/2009 | Upton | 717/106 |
| 7,526,680 B2* | 4/2009 | Mathew et al. | 714/37 |
| 7,581,212 B2 | 8/2009 | West et al. | |
| 7,596,731 B1* | 9/2009 | Sharma | 714/724 |
| 7,809,525 B2 | 10/2010 | Chagoly et al. | |
| 7,849,447 B1 | 12/2010 | Karis et al. | |
| 8,001,527 B1* | 8/2011 | Qureshi et al. | 717/120 |
| 8,205,191 B1* | 6/2012 | Kolawa et al. | 717/124 |
| 8,266,592 B2* | 9/2012 | Beto et al. | 717/124 |
| 8,276,123 B1* | 9/2012 | Deng et al. | 717/125 |
| 8,411,579 B2* | 4/2013 | Ngo et al. | 370/248 |
| 8,561,036 B1* | 10/2013 | Beans et al. | 717/140 |
| 2002/0138226 A1* | 9/2002 | Doane | 702/119 |
| 2003/0126586 A1* | 7/2003 | Sluiman et al. | 717/124 |
| 2003/0131290 A1* | 7/2003 | Weinberg et al. | 714/46 |
| 2004/0107415 A1* | 6/2004 | Melamed et al. | 717/124 |
| 2004/0123272 A1* | 6/2004 | Bailey et al. | 717/125 |
| 2005/0071818 A1* | 3/2005 | Reissman et al. | 717/127 |
| 2005/0144593 A1* | 6/2005 | Raghuvir et al. | 717/124 |
| 2005/0166094 A1* | 7/2005 | Blackwell et al. | 714/38 |
| 2006/0129994 A1* | 6/2006 | Srivastava et al. | 717/124 |
| 2006/0168565 A1* | 7/2006 | Gamma et al. | 717/122 |
| 2006/0200803 A1* | 9/2006 | Neumann et al. | 717/120 |
| 2007/0038908 A1* | 2/2007 | Hirano et al. | 714/724 |
| 2007/0043980 A1* | 2/2007 | Ohashi et al. | 714/45 |
| 2007/0055911 A1* | 3/2007 | Boehm et al. | 714/31 |
| 2007/0220341 A1* | 9/2007 | Apostoloiu et al. | 714/33 |
| 2007/0226543 A1* | 9/2007 | Young et al. | 714/43 |
| 2008/0010537 A1* | 1/2008 | Hayutin et al. | 714/38 |
| 2008/0065687 A1* | 3/2008 | Coulter et al. | 707/102 |
| 2008/0086348 A1 | 4/2008 | Rao et al. | |
| 2008/0086499 A1* | 4/2008 | Wefers et al. | 707/102 |
| 2008/0098361 A1* | 4/2008 | Kumar et al. | 717/124 |
| 2008/0127095 A1* | 5/2008 | Brennan et al. | 717/124 |
| 2008/0141221 A1* | 6/2008 | Benesovska et al. | 717/124 |
| 2008/0172652 A1* | 7/2008 | Davia et al. | 717/124 |
| 2008/0184206 A1* | 7/2008 | Vikutan | 717/127 |
| 2008/0228805 A1* | 9/2008 | Bruck et al. | 707/102 |
| 2008/0263505 A1* | 10/2008 | StClair et al. | 717/101 |
| 2009/0106262 A1 | 4/2009 | Fallen et al. | |
| 2009/0138855 A1* | 5/2009 | Huene et al. | 717/125 |
| 2009/0144010 A1* | 6/2009 | Witter et al. | 702/115 |
| 2009/0144698 A1* | 6/2009 | Fanning et al. | 717/120 |
| 2009/0183143 A1 | 7/2009 | Li et al. | |
| 2009/0187894 A1* | 7/2009 | Bell et al. | 717/127 |
| 2009/0199160 A1* | 8/2009 | Vaitheeswaran et al. | 717/124 |
| 2009/0204591 A1* | 8/2009 | Kaksonen | 707/3 |
| 2009/0259992 A1* | 10/2009 | Cormier et al. | 717/126 |
| 2009/0265681 A1* | 10/2009 | Beto et al. | 717/100 |
| 2009/0307650 A1* | 12/2009 | Saraf et al. | 717/101 |
| 2009/0313606 A1* | 12/2009 | Geppert et al. | 717/124 |
| 2010/0064282 A1* | 3/2010 | Triou et al. | 717/125 |
| 2010/0146490 A1* | 6/2010 | Grosse et al. | 717/131 |
| 2010/0192220 A1 | 7/2010 | Heizmann et al. | |
| 2010/0287534 A1* | 11/2010 | Vangala et al. | 717/124 |
| 2010/0332535 A1* | 12/2010 | Weizman et al. | 707/770 |
| 2011/0145788 A1* | 6/2011 | Xu et al. | 717/121 |
| 2012/0197626 A1* | 8/2012 | Kejariwal et al. | 703/22 |
| 2012/0216176 A1* | 8/2012 | Gaikwad et al. | 717/124 |
| 2013/0014084 A1* | 1/2013 | Sahibzada et al. | 717/124 |
| 2013/0275949 A1* | 10/2013 | Kawashima et al. | 717/124 |
| 2014/0025994 A1* | 1/2014 | Kube et al. | 714/33 |
| 2014/0040867 A1* | 2/2014 | Wefers et al. | 717/131 |
| 2014/0115565 A1* | 4/2014 | Abraham et al. | 717/128 |
| 2014/0237450 A1* | 8/2014 | Levy et al. | 717/124 |
| 2014/0304688 A1* | 10/2014 | Bhat et al. | 717/130 |
| 2014/0325485 A1* | 10/2014 | Sawano | 717/124 |

OTHER PUBLICATIONS

Jinhua Li, Clustering User Session Data for Web Applications Test, 2011, Journal of Computational Information Systems.

G. Ruffo, R. Schifanella, and M. Sereno, WALTy: A User Behavior Tailored Tool for Evaluating Web Application Performance, 2004, Proceedings of the Third IEEE International Symposium on Network Computing and Applications.

Sanaa Alsmadi, Generation of Test Cases From Websites User Sessions, 2011, The 5th International Conference on Information Technology.

* cited by examiner

GENERATING TEST SCENARIO TEMPLATES FROM TESTING DATA OF DIFFERENT ORGANIZATIONS UTILIZING SIMILAR ERP MODULES

CROSS-REFERENCE TO RELATED APPLICATIONS

This application is a Continuation-In-Part of application Ser. No. 13/103,078, filed May 8, 2011. This Application claims the benefit of U.S. Provisional Patent Application No. 61/747,313, filed Dec. 30, 2012, and U.S. Provisional Patent Application No. 61/814,305, filed Apr. 21, 2013. This application also claims the benefit of U.S. Provisional Patent Application No. 61/919,773, filed Dec. 22, 2013, the entire contents of which is herein incorporated by reference in its entirety for all that it teaches without exclusion of any part thereof.

The following co-pending US patent applications, filed on Dec. 27, 2013: Ser. Nos. 14/141,514; 14/141,564; 14/141,588; 14/141,623; 14/141,655; 14/141,676; 14/141,859; 14/141,887; 14/141,925; 14/141,974, and the following co-pending US patent applications, filed on Dec. 28, 2013: Ser. Nos. 14/142,768; 14/142,769; 14/142,770; 14/142,771; 14/142,772; 14/142,774; 14/142,781; 14/142,783; 14/142,784, may include related subject matter.

BACKGROUND

Many organizations utilize complex software systems, such as Enterprise Resource Planning (ERP) systems, for conducting almost all aspects of their business. Thus, it is important that the software systems perform as expected. Organizations often devote many resources for the purpose of testing and validating the performance of their software systems. This task is often daunting given the complexity of the software systems, the large number of software modules they may include, and the wide array of possibilities for customizations that may be done to the software modules.

Different organizations may utilize different software modules and also customize them differently. However, it is often the case that software systems belonging to different organizations end up utilizing many software modules that are the same or similar, and/or software modules that involve similar customizations. For example, software systems belonging to different organizations in the same field of operations may involve similar customizations that are related to the field of operations. Additionally, software systems of different organizations may involve similar updates, such as when a new build of a generic software module is released. Thus, despite organization-specific differences in software systems of different organization, it is often the case that testers belonging to the different organizations end up running the same, or quite similar, tests for testing at least some of the components of their respective systems.

Current testing approaches adopted by many organizations require each organization to devise its own testing suite. Thus, each organization needs to learn which tests are effective, which components of the software system should be tested, and how to do so in a cost-effective way. Gaining this knowledge may require much effort and experience; in the meantime, testing the software systems may be a less effective and prolonged process. However, were organizations able to utilize each other's testing-related knowledge, which is in a sense a wisdom of the (testing) crowd, they might be able to come up with a more effective and efficient testing plan. That being said, there are many obstacles in the way of harnessing the wisdom of the crowd when it comes to testing. For one, software systems belonging to different organizations are each customized for their respective organizations. Thus, it is not likely that a test devised for a first organization will run "as is" on a system belonging to a second organization. Additionally, tests used to test a system belonging to an organization often contain proprietary data related to the organization. Thus, organizations are not likely to share their testing data if it means that in the process, their proprietary data is at risk of being leaked to an unauthorized party.

BRIEF SUMMARY

Some aspects of this disclosure involve methods, systems, and/or non-transitory computer-readable medium, which enable generation and/or suggestion of test scenario templates that are relevant to validating a software system. The test scenario templates may be generated based on data collected from crowd users, e.g., testers from other organizations, tasked with testing similar software systems.

In one embodiment, a test scenario template is a model according to which a test scenario may be structured. A test scenario template may include one or more test steps, which instruct a user on an action to be performed as part of the test, such as where to enter a value, what button to push, what screen to select, or what transaction to run. Optionally, a test scenario template may include one or more default values used for running an instantiation of the test scenario template (e.g., default values for certain fields in a screen).

Some embodiments described herein addresses a challenge faced when attempting to utilize the wisdom of the crowd for testing, which concerns the ability to generate and/or select appropriate tests for testing components of a software system of a certain organization. Copious testing data may be collected from a large number of diverse organizations that involve various software modules and different components. Given a new organization that requires testing of components of software modules it utilizes, the relevant testing data may be selected from among the large quantities of diverse testing data that may be available from different organizations.

One aspect of this disclosure involves use of descriptions of organizations to determine similarity between organizations. The descriptions may include details about customizations to software modules, and/or components of software modules, utilized by the organizations. Analysis of the customizations may reveal what components are utilized by the organizations. Thus, cases in which a first organization utilizes a certain component that is also utilized by a second organization, may be identified and exploited. In such a case, a test utilized by the second organization to test the certain component may be used to generate a test scenario template to be used by the first organization.

One aspect of this disclosure involves a computer system that is configured to generate a test scenario template from data collected from users running test scenarios to test vendor-customized packaged application modules. The computer system includes a module analyzer that is configured to receive a first description of a first set of vendor-customized packaged application modules, and a second description of a second set of vendor-customized packaged application modules. A first organization utilizes the first set of modules, and a second organization utilizes the second set of modules. Additionally, the first description includes customizations to modules belonging to the first set and the second description includes customizations to modules belonging to the second set. The module analyzer is also configured to identify, based on the first and second descriptions, a first customization to a first instance of a certain module and a second customization to a second instance of the certain module. The first and second instances belong to the first and second sets, respectively. Additionally, the first customization is similar to the second customization. The computer system also includes a component analyzer that is configured to identify, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module. A template generator, belonging to the system, is configured to receive a specific run of a test scenario run to test the second instance, and a description of similar components comprising an indication of at least one component of the second instance that is similar to at least one component of the first instance. The template generator is also configured to generate, based on the specific run and the description of similar components, a test scenario template for testing the first instance. A data cleaner may be used to remove from the test scenario template proprietary data associated with the second organization.

In one embodiment, the computer system may optionally include a customization module configured to customize the test scenario template by adding to the test scenario template proprietary data relevant to the first organization. Additionally or alternatively, the computer system may optionally include a user interface configured to suggest to a user to run an instantiation of the test scenario template.

Another aspect of this disclosure involves a computer implemented method for generating a test scenario template from data collected from users running test scenarios to test vendor-customized packaged application modules. Executing the method may involve performing the following: Receiving a first description of a first set of instances vendor-customized packaged application modules. A first organization uses the first set and the first description comprises customizations to modules from the first set. Receiving a second description of a second set of instances vendor-customized packaged application modules. A second organization uses the second set and the second description comprises customizations to modules from the second set.

Identifying, based on the first and second descriptions, a first customization to a first instance of a certain module and a second customization to a second instance of the certain module. The first and second instances belongs to the first and second sets, respectively. Additionally, the first customization is similar to the second customization. Identifying, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module. Receiving a specific run of a test scenario run to test the second instance, and a description of similar components comprising an indication of at least one component of the second instance that is similar to at least one component of the first instance. Generating, based on the specific run and the description of similar components, a test scenario template for testing the first instance. And removing from the test scenario template proprietary data associated with the second organization.

In one embodiment, executing the method may optionally involve customizing the test scenario template for the first organization by adding to the test scenario template proprietary data relevant to the first organization. In another embodiment, executing the method may optionally involve receiving proprietary data associated with the first organization. Additionally, customizing the test scenario template for the first organization may involve adding to the test scenario template at least some of the received proprietary data associated with the first organization. In yet another embodiment, executing the method may optionally involve suggesting to a user to run an instantiation of the test scenario template.

Yet another aspect of this disclosure involves a non-transitory computer-readable medium for use in a computer to generate a test scenario template from data collected from users running test scenarios to test vendor-customized packaged application modules. The computer includes a processor, and the non-transitory computer-readable medium includes the following program code: Program code for receiving a first description of a first set of instances vendor-customized packaged application modules. A first organization uses the first set and the first description comprises customizations to modules from the first set. Program code for receiving a second description of a second set of instances vendor-customized packaged application modules. A second organization uses the second set and the second description comprises customizations to modules from the second set. Optionally, the second set includes at least one module that is not included in the first set. Program code for identifying, based on the first and second descriptions, a first customization to a first instance of a certain module and a second customization to a second instance of the certain module; the first and second instances belongs to the first and second sets, respectively. Additionally, the first customization is similar to the second customization. Program code for identifying, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module. Program code for receiving a specific run of a test scenario run to test the second instance, and a description of similar components comprising an indication of at least one component of the second instance that is similar to at least one component of the first instance. Program code for generating, based on the specific run and the description of similar components, a test scenario template for testing the first instance. And program code for removing from the test scenario template proprietary data associated with the second organization.

In one embodiment, the non-transitory computer-readable medium optionally stores program code for ranking popularity of runs of test scenarios run to test the second instance of the certain module, and selecting the specific run from the most popular results. In one embodiment, the non-transitory computer-readable medium optionally stores program code for customizing the test scenario template for the first organization.

BRIEF DESCRIPTION OF THE DRAWINGS

The embodiments are herein described, by way of example only, with reference to the accompanying drawings. In the drawings.

DETAILED DESCRIPTION

Figure 1:
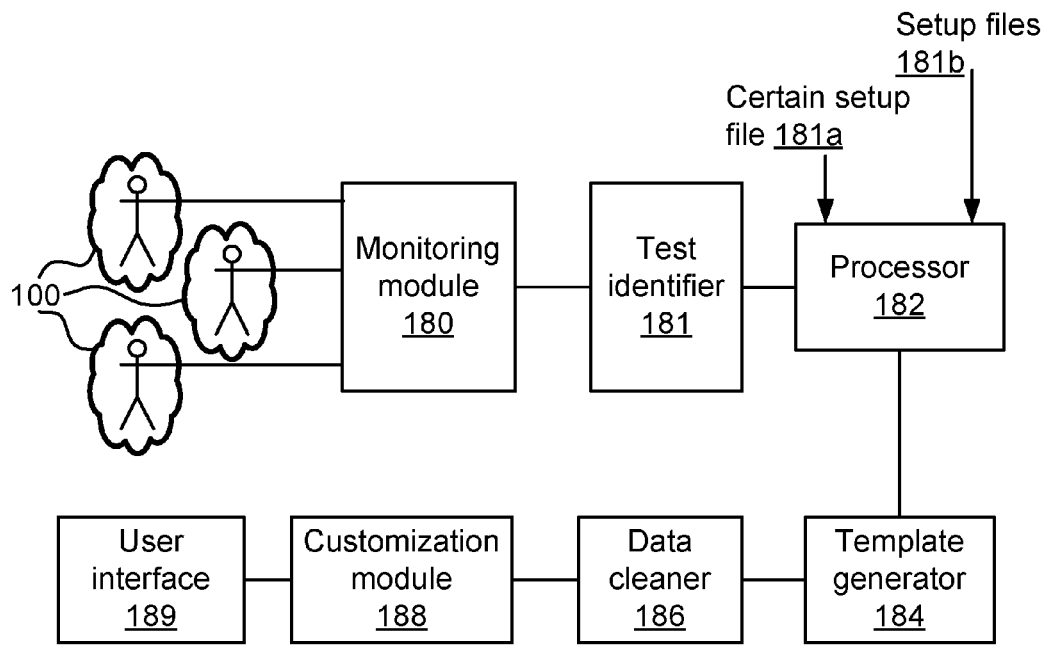
FIG. 1 illustrates one embodiment of a computer system configured to generate a test scenario template based on similarity between setup files associated with different organizations.

The term "transaction" is defined as a computer program, such as SAP ERP transaction or Oracle Application Form. In one example, a transaction may enable a user to access a certain functionality and/or may be called by filling its code in a box in a screen and/or by selecting it from a menu. In another example, a transaction is a logical portion of work, performed by a processor, involving the execution of one or more SQL statements.

The term "test step" refers to one or more actions performed via a User Interface (UI) as part of running a test scenario. In some cases, performing actions via a user interface may be achieved by interacting with the user interface, and/or by interacting with an Application Program Interface (API) related to the user interface.

The terms "a description of a run of a test scenario", also referred to as "a run of a test scenario", refer to data pertaining to running a test scenario on a software system (e.g., inputs, outputs, and/or intermediate data generated prior to running the test scenario, data generated during its run, and/or data generated as a result of running the test scenario). In one example, a run of test scenario may be obtained from monitoring a user running the test scenario on a software system. In the interest of brevity, in this disclosure, a term like "run of a test scenario" may be replaced with the shorter "run", where it is clear from the context. A run of a test scenario may be referred to as being "run by a user". This means that data included in the run of the test scenario is related to, or generated from, activity of the user on a software system, in which test steps of the test scenario were executed. Optionally, at least some of the data included in the run of the test scenario is derived from monitoring the activity of the user, which is related to execution of the test steps. Additionally, a run of a test scenario may be referred to as being associated with an organization, meaning that the run of the test scenario was run by a user belonging to the organization. Optionally, the user belonging to the organization ran the test scenario, at least in part, on a software system that belongs to the organization. Moreover, if it is mentioned, for example, that runs of test scenarios are received or clustered, it is meant that the objects being received may be processed descriptions of the runs of test scenarios (e.g., describing various attributes of the runs of the test scenarios), and not necessarily the actual raw recorded data that was initially obtained from monitoring users running the test scenarios.

A run of a test scenario may be considered an instantiation of the test scenario. That is, a certain test scenario may be run several times. For example, a test scenario may be run by different users, run on different systems, and/or run by the same user on the same system at different times. Each time the test scenario is run, that may be considered an event of instantiating the test scenario, and each run of the test scenario may be considered an instantiation of the test scenario.

In some embodiments, runs of test scenarios are identified from data obtained from monitoring users. Optionally, monitoring users may involve detecting, recording, and/or analyzing information entered by the users to computer systems and/or information presented to the users by the computer systems. Additionally or alternatively, monitoring may involve logging programs that were executed by the users, values utilized by the programs, memory content of programs and/or network traffic related to activities taken by the users. Optionally, a run of a test scenario may include data obtained from monitoring that underwent processing, summarization and/or analysis. Thus, a run of a test scenario need not necessarily include all data obtained from monitoring the running of the test scenario, and/or include data obtained from the monitoring in the same form as it was originally collected in.

A run of a test scenario may include descriptions of various aspects of running the test scenario such as: (i) the identity and/or composition (e.g., field types and/or identifiers) of a user interface (UI) screens the user manipulated and/or was exposed to while running the test scenario; (ii) user interactions with a system (e.g., actions performed by the user) (iii) transactions executed; (iii) behavior of the system during the test scenario (e.g., content of network transmissions, procedure calls, requests made to components of the system); and/or (iv) representations of the state of the system at various stages before, during, and/or after the test scenario is run. Additionally, a run of a test scenario may include data extracted from the test scenario and/or template of which the run is an instantiation. For example, the run may include values taken from a script according to which the run is executed and/or default values that appeared in template of which the run is an instantiation. The run may even include portions, or the entire scope, of the test scenario and/or the template of which the run is an instantiation.

A test scenario that is run by a user may be characterized according to its degree of automation, depending on type of involvement required of the user. In cases where the user is required to enter most of the values (e.g., field values on a screen), the run of the test scenario may be considered to be a manual run. In other cases, where the system provides some of the values (e.g., automatically fills values in no more than 95% of the fields on a screen/transaction/business process), but the user is still required to provide other values (e.g. enter values to fields that remain without values in the screen/ transaction/business process), the run of the test scenario may be considered to be a semiautomatic run. In cases where little to no user intervention is needed (e.g., the script for running a test includes more than 95% of the values to be entered to the UI for the test, and is read by the system), the run of the test scenario may be considered to be an automatic run.

The term "test scenario template" refers to a model according to which a test scenario may be structured. A test scenario template may include one or more test steps, which instruct a user on an action to perform as part of the test, such as where to enter a value, what button to push, what screen to select, or what transaction to run. Optionally, a test scenario template may include one or more default values used for running an instantiation of the test scenario template (e.g., default values for certain fields in a screen). Additionally or alternatively, a test scenario template may be missing one or more values that are required for running an instantiation of the test scenario template; in such a case, a user running the instantiation of a template may provide the one or more missing values. In the interest of brevity, in this disclosure, a term like "test scenario template" may be replaced with the shorter "template", where it is clear from the context.

A run of a test scenario based on a test scenario template may be considered an instantiation of the test scenario template. For example, different users may run test scenarios based on a certain template; each time one of the users runs a test scenario based on the certain template, the corresponding run of that test scenario is considered an instantiation of the certain template. Similarly, if a user runs multiple test scenarios based on a template, where each time a test scenario was run it was run on a same software system, each of the runs of the test scenarios is considered a separate instantiation of the certain template. Optionally, a test scenario template may be considered associated with an organization if a user belonging to the organization ran an instantiation of the template and/or is intended to run an instantiation of the template. Additionally or alternatively, a test scenario template may be considered associated with an organization if the template was generated based on one or more runs of test scenarios that are associated with the organization.

As used herein, the term "software system" refers to a computer system that has software components (e.g., software modules that include programs). A software system may involve hardware (e.g., servers with processors) on which the software may run. The hardware may be dedicated hardware for the software system (e.g., servers sitting at an organization to which the software systems belong). Additionally or alternatively, hardware involved in a software system may be allocated on demand (e.g., cloud-based servers that are utilized by the software system as needed by it).

FIG. 1 illustrates one embodiment of a computer system configured to generate a test scenario template based on similarity between setup files associated with different organizations. The computer system includes at least a test identifier 181, a processor 182, a template generator 184, and a data cleaner 186.

The test identifier 181 is configured to identify runs of test scenarios run by users on software systems that belong to the different organizations. In this embodiment, each organization of the different organizations is associated with a different setup file customized for the organization.

The processor 182 is configured to receive the setup files 181*b* that are associated with the different organizations and a certain setup file 181*a* that is associated with a certain organization. The processor 182 is also configured to identify, based on similarity between the certain setup file 181*a* and the setup files 181*b*, similar organizations, from among the different organizations, which are similar to the certain organization.

In one embodiment, an organization may be considered similar to the certain organization if the similarity between the certain setup file 181*a* and a setup file of the organization exceeds a predetermined threshold. For example, the number of configuration elements that are common to both setup files reaches a predetermined threshold (e.g., 40% of the configuration elements in the certain setup file are also present in the setup file of the organizations, and vice versa).

In another embodiment, a predetermined proportion of the different organizations that have the most similar setup files to the certain setup file 181*a* are considered similar to the certain organization. For example, the top 20% of the different organizations that have the most similar setup files are considered similar to the certain organization.

The processor 182 is also configured to identify a run of a specific test scenario that is utilized by one or more of the similar organizations. Optionally, selection of the run of the specific test scenario is based on the certain setup file 181*a*. For example, based on the certain setup file 181*a*, it may be determined which modules and/or business processes are utilized by the certain organization, and the specific test scenario involves one or more of those modules and/or business processes. Optionally, selection of the run of the specific test scenario is based on a profile of the certain organization which indicates which business processes and/or modules it typically utilizes.

In one embodiment, the run of the specific test scenario is a run by a user belonging to an organization with a setup file that has high similarity to the certain setup file 181*a*. Optionally, the run of the specific test scenario is a run by a user belonging to an organization with a setup file that has highest similarity to the certain setup file 181*a*.

In another embodiment, the specific test scenario is a test scenario widely utilized by the similar organizations. For example, of all the test scenarios which have instantiated runs identified by the test identifier 181, the specific test scenario is one that has instantiated runs associated with the largest number of similar organizations. In another example, the specific test scenario is a test scenario that has a large number of instantiations of runs that are associated with one or more of the similar organizations. For example, there are at least 100 different runs of the specific test scenario that are associated with organizations belonging to the similar organizations.

The template generator 184 is configured to generate the test scenario template based on the run of the specific test scenario. Optionally, the template identifies a transaction used in the run of the specific test scenario, and possible values for running the transaction. For example, the template may include identifiers of transactions and/or code that run the transactions. Additionally, the template may include values for running the transaction such as default input values that the transaction can use.

The data cleaner 186 is configured to remove from the test scenario template proprietary data associated with at least one of the similar organizations. Additionally or alternatively, the data cleaner 186 may be configured to remove proprietary data from the run of the specific test scenario. Optionally, most output fields of the run of the specific test scenario are removed, and as a result, the test scenario template does not include expected values for most test steps. Optionally, the output fields may be removed by the data cleaner 186, the template generator 184, a customization module 188, and/or by another suitable module or combination of modules.

In one embodiment, a value in the test scenario template may be considered proprietary and consequently removed from the template. Optionally, the proprietary value is removed by the data cleaner 186 and/or a different module such as the template generator 184. Optionally, a decision on whether a value is proprietary may be based on at least one of: a number of the runs of test scenarios that include the value, and a number of different organizations associated with the runs of the test scenarios in which the value appears. Optionally, if the number of runs in which the value appears is below a certain threshold and/or the number of organizations associated with runs in which the certain value appears is below a certain threshold then the data cleaner 186 may remove the certain value from the template. Optionally, the data cleaner 186 may enable or restrict the customization module 188 from utilizing a certain value based on whether or not the certain value is considered proprietary.

In one embodiment, the specific test scenario was not available in any test suite of the certain organization prior to generating the test scenario template. Thus, the generated template may enable testing of new aspects of a system of the certain organization that were not tested before.

In one embodiment, the computer system also optionally includes a customization module 188 that is configured to customize the test scenario template by adding to the test scenario template proprietary data relevant to the certain organization. Optionally, the customization module is configured to utilize data included in the certain setup file 181a to customize the test scenario template. For example, the certain setup file 181a may include organizations-specific values that may be utilized as default values when running instantiations of the template.

In one embodiment, the computer system also optionally includes a user interface 189 that is configured to suggest to a user to run an instantiation of the test scenario template. Optionally, the user belongs to the certain organization.

In one embodiment, the processor 182 is also configured to receive usage data associated with the certain organization, and utilize the usage data to identify the run of the specific test scenario. For example, the usage data may indicate which modules, business processes, and/or transactions are utilized by the certain organization and/or extent at which the certain organization utilizes certain modules, business processes, and/or transactions. This data may be used to guide the selection of a specific test scenario that involves similar modules, business processes, and/or transactions to the ones that are utilized by the certain organization.

In one embodiment, the computer system also includes a monitoring module 180 that is configured to monitor the users 100 belonging to the different organizations to identify runs of test scenarios run on software systems belonging to the different organizations.

In one embodiment, the processor 182 is also configured to identify a second run of the specific test scenario, and the template generator 184 is also configured to generate the test scenario template based on the second run. The generated test scenario template identifies a transaction used by the run of the specific test scenario the second run of the specific test scenario, and possible values for running the transaction. Optionally, at least one of the possible values for running the transaction does not appear in each of the run of the specific test scenario the second run of the specific test scenario. Optionally, the test scenario template includes a combination of values, which does not appear in any of the run of the specific test scenario the second run of the specific test scenario.

In another embodiment, the processor 182 is also configured to identify a second run of a second test scenario, and the template generator 184 is also configured to generate the test scenario template based on the second run. The generated test scenario template identifies a transaction used by the run of the specific test scenario the second run of the specific test scenario, and possible values for running the transaction. Optionally, at least one of the possible values for running the transaction does not appear in each of the run of the specific test scenario the second run of the second test scenario. Optionally, the test scenario template includes a combination of values which does not appear in any of the run of the specific test scenario the second run of the second test scenario.

In one embodiment, a setup file is a source of information (e.g., program code and/or a data file), that may be used to control and/or customize a software system. In one example, a setup file may be used to define the way a business process works. Business processes are often designed and/or developed in a parametric way; the setup file may contain values for many system parameters that can be set in order to define how the system behaves. In another example, a setup file may indicate which screens are to be utilized in a business process, and/or the layout and/or content of screens; for instance, field names, field locations, and/or field values that are to appear in screens. In yet another example, a setup file may indicate logic that links between screens (e.g., logic that controls the transition between various screens when a user is interacting with the software system). In this example, the logic may be implicitly stated (e.g., by including code that realizes the logic and/or values that are used by the logic) and/or the logic may be in the form of indicating certain programs and/or procedures that may utilized to control the flow of the execution of the software system.

In one embodiment, a setup file does not necessarily store all information that defines how a system behaves. For example, a setup file may or may not include user permissions. Thus, while in some cases user permissions (e.g., access permission to resources) may be stored at a server end (e.g., a server from which a resource may be accessed), while the setup file may be stored on the client end (e.g., on a software system of an organization). In another example, a setup file may or may not store information related to backing-up data on a system. Optionally, a back-up policy for the system may be stored on an external system which stores the backed-up files.

In one embodiment, similarity of setup files is determined according certain values described in the setup files. Thus, based on modules, business processes, and/or transactions that are mentioned in setup files and/or values associated with the modules, business processes, and/or transactions, it may be determined if two setup files are similar and/or a degree of their similarity. In one example, two setup files may be considered similar if a certain module or business process is mentioned in both. In another example, a degree of similarity between two setup files is proportional to the overlap of business processes mentioned in the two setup files. Thus, two setup files may be considered similar if the overlap of business processes described in both setup file exceeds a predetermined threshold.

In another embodiment, setup files are treated as documents, and determining similarity between setup files is done utilizing natural language and/or semantic analysis methods. For example, setups file may be represented as a "bag of words", e.g., in a vector representation, and various methods such as latent semantic analysis may be used to find similar setup files and/or determine the level of similarity between setup files.

In some embodiments, setup files may become quite large, e.g., encompassing many business processes and containing many values. Thus, it may quite difficult to compare these large and potentially diverse objects, making it unlikely to find two setup files that are similar enough throughout. However, certain portions of the setup files may be similar. For example, two setup files may primarily involve different modules, however, the portions in the two setup files that happen to involve the same modules may be quite similar. Optionally, given a run of a test scenario, subsets of setup files that are relevant to the run are selected and compared in order to determine similarity of the setup files. For example, given a run, the specific business processes involved in the run are identified, and setup files are compared with respect to a subset of their values that is related to the specific business processes. Restricting the comparison of the setup files to certain subsets of the files can both may the comparisons more computationally tractable and increase the chances of finding similar setup files.

In one embodiment, usage data associated with the certain organization is received and utilized for identifying the similar organizations similar to the certain organization. Optionally, the usage data includes data pertaining to one or more module and/or business process utilized by the certain organization. Additionally or alternatively, the usage data may include one or more run of a test scenario associated with the certain organization. Based on the usage data, similarity between the setup file of the certain organization and the files of the different organizations can be determined with respect to the usage data. This enables the detection of organizations that are similar to the certain organization with respect to the usage data.

In one example, the usage data is received from monitoring the certain organization. Activities recorded in the usage data, such as a listing of executed transactions, may be compared with the activities that characterize a run of a test scenario that is utilized by one or more of the similar organizations. If the comparison results in a close hit, the test scenario is considered to be utilized by the certain organization; if the comparison does not result in a close hit, the test scenario is considered not to be utilized by the certain organization.

It is to be noted that different embodiments may implement components of the computer system illustrated in FIG. 1 in different ways. For example, in some embodiments one or more of the following may be implemented as software modules running on the processor 182: the monitoring module 180, the test identifier 181, the template generator 184, the data cleaner 186, the customization module 188, and the user interface 189. Additionally, one or more of the aforementioned components may be implemented on a remote server, such as a cloud-based server. Optionally, one or more of the aforementioned modules may be realized, at least in part, by the same software module.

In one example, the customization module 188 and/or the data cleaner 186 are both implemented as part of the template generator 184. In another example, the test identifier 181 and the monitoring module 180 are realized by the same software module that both performs monitoring and analyzes data obtained from the monitoring in order to identify the runs of the test scenarios. In another example, the monitoring module 180 is realized at least in part as a software module that runs on software systems with which the users interact in order to run the test scenarios. The test identifier 181, may be implemented at least in part as a remote service (e.g., a cloud-based service) that receives data obtained from the monitoring.

In one embodiment, the test scenario template undergoes customization by the customization module 188 prior to removal of proprietary data from the template by the data cleaner 186. In another embodiment, the order is reversed: proprietary data is removed from the template by the data cleaner 186, and then the template is customized by the customization module 188. In still another embodiment, customizing the template and removing proprietary data from it are performed by the same software module. Optionally, the software module utilizes the certain setup file 181a and/or the setup files 181b to determine which proprietary data needs to be removed from the template, and which proprietary data should be added to the template when customizing it.

Figure 2:
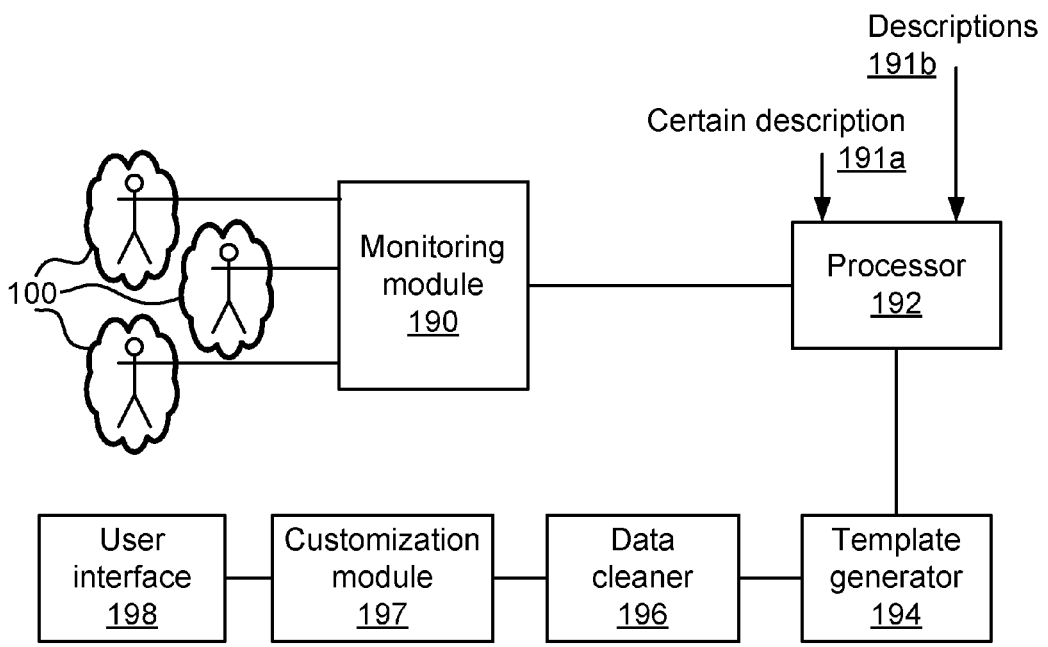
FIG. 2 illustrates one embodiment of a computer system configured to generate a test scenario template based on similarity between descriptions associated with different organizations.

FIG. 2 illustrates one embodiment of a computer system configured to generate a test scenario template based on similarity between descriptions associated with different organizations. The illustrated embodiment includes at least a monitoring module 190, a processor 192, a template generator 194, and a data cleaner 196.

The monitoring module 190 is configured to monitor users 100 belonging to different organizations to identify runs of test scenarios run on software systems belonging to the different organizations. Optionally, the monitoring is done at least in part on the software systems belonging to the different organizations. For example, the monitoring module 190 includes modules that are installed on the software systems of the different organizations and collects data generated while the users 100 are running the test scenarios. Additionally or alternatively, the monitoring module 190 may operate remotely from the software systems of the different organizations. For example, the monitoring module may be implemented, at least in part, using programs running on a cloud-based server that receive information related to activity of the users 100 on the software systems of the different organizations.

The processor 192 is configured to receive a certain description 191a of a certain organization and descriptions 191b of the different organizations. For example, the certain description 191a may include a field of operation of the certain organization. The processor 192 is also configured to identify, based on similarity between the certain description 191a and the descriptions 191b, similar organizations that are similar to the certain organization.

In one embodiment, an organization may be considered similar to the certain organization if the similarity between the certain description 191a and a description of the organization exceeds a predetermined threshold. In another embodiment, a predetermined proportion of the different organizations that have the most similar descriptions to the certain description 191a are considered similar to the certain organization. For example, the top 20% of the different organizations that have the most similar descriptions are considered similar to the certain organization.

The processor 192 is also configured to identify a run of a specific test scenario that is utilized by one or more of the similar organizations. Optionally, selection of the run of the specific test scenario is based on the description 191a. For example, based on the certain description 191a, it may be determined which modules and/or business processes are utilized by the certain organization, and the specific test scenario involves one or more of those modules and/or business processes. Optionally, selection of the run of the specific test scenario is based on a profile of the certain organization which indicates which business processes and/or modules it typically utilizes.

In one embodiment, the run of the specific test scenario is a run by a user belonging to an organization with a description that has high similarity to the certain description 191a. Optionally, the run of the specific test scenario is a run by a user belonging to an organization with a description that has highest similarity to the certain description 191a.

In another embodiment, the specific test scenario is a test scenario widely utilized by the similar organizations. For example, of all the test scenarios which have instantiated runs identified by the monitoring module, the specific test scenario is one that has instantiated runs associated with the largest number of similar organizations. In another example, the specific test scenario is a test scenario that has a large number of instantiations of runs that are associated with one or more of the similar organizations. For example, there are at least 100 different runs of the specific test scenario that are associated with organizations belonging to the similar organizations.

In one example, the certain description 191a of the certain organization comprises usage data associated with the certain organization, and the processor 192 is further configured to utilize the usage data to identify the run of the specific test scenario. For example, the usage data may mention certain business processes, and the processor 192 may inspect the runs of various test scenarios to detect a run of a specific test scenario that involves the certain business processes. Optionally, if two descriptions that include usage data may be considered similar if they both describe usage of a certain number of business processes. For example, if the two descriptions have an overlap of at least 25% in the business processes they described, they may be considered similar. In another example, if two descriptions have at least 50 business processes in common, they may be considered similar.

The template generator 194 is configured to generate the test scenario template based on the run of the specific test scenario. Optionally, the template identifies a transaction used in the run of the specific test scenario, and possible values for running the transaction. For example, the template may include identifiers of transactions and/or code that runs the transactions. Additionally, the template may include values for running the transaction such as default input values that the transaction can use.

The data cleaner 196 is configured to remove from the test scenario template proprietary data associated with at least one of the similar organizations. Additionally or alternatively, the data cleaner 196 may be configured to remove proprietary data from the run of the specific test scenario. Optionally, most output fields of the run of the specific test scenario are removed, and as a result, the test scenario template does not include expected values for most test steps. Optionally, the output fields may be removed by the data cleaner 196, the template generator 194, a customization module 197, and/or by another suitable module or combination of modules.

In one embodiment, a value in the test scenario template may be considered proprietary and consequently removed from the template. Optionally, the proprietary value is removed by the data cleaner 196. Optionally, a decision on whether a value is proprietary may be based on at least one of: a number of the runs of test scenarios that include the value, and a number of different organizations associated with the runs of the test scenarios in which the value appears. Optionally, if the number of runs in which the value appears is below a certain threshold and/or the number of organizations associated with runs in which the certain value appears is below a certain threshold then the data cleaner 196 may remove the certain value from the template. Optionally, the data cleaner 196 may enable or restrict the customization module 197 from utilizing a certain value based on whether or not the certain value is considered proprietary.

In one embodiment, the specific test scenario was not available in any test suite of the certain organization prior to generating the test scenario template. Thus, the generated template may enable testing of new aspects of a system of the certain organization that were not tested before.

In one embodiment, the computer system also includes the customization module 197 that is configured to customize the test scenario template by adding to the test scenario template proprietary data relevant to the certain organization. Optionally, the customization module is configured to utilize data included in the certain description 191a to customize the test scenario template. For example, the certain description 191a may include organizations-specific values that may be utilized as default values when running instantiations of the template.

In one embodiment, the computer system also includes a user interface 198 that is configured to suggest to a user to run an instantiation of the test scenario template. Optionally, the user belongs to the certain organization.

In one embodiment, a description of an organization (e.g., the certain description 191a) may include information characterizing the organization and/or systems belong to it. For example, languages used by users belonging to the organization, location of the organization, size of the organization, and/or a field of operation of the organization (e.g., insurance, defense, communications, etc.) For example, the location of the organization may change the behavior and logic of a screens; e.g., tax rules change between countries, and the related screens presented to users may reflect the differences in tax rules. In one example, organizations in the same field of operation are considered similar. Alternatively, organizations in the same field of operation and having approximately the same number of employees are considered similar.

In another embodiment, a description of an organization may include permissions and/or authorizations relevant to a system of the organization. Such information may assist in selecting relevant test scenarios for the certain organization (e.g., a test scenario that involves specific procedures and/or modules that are utilized by the certain organization). For example, organizations that implement similar organizational hierarchies and/or security procedures may be considered similar (e.g., organizational hierarchies and/or security procedures may be reflected in listings of permissions included in the descriptions).

In yet another embodiment, a description of an organization (e.g., the certain description 191a) describes usage information of the organization; for example, information pertaining to modules and/or business processes utilized by the certain organization. Optionally, the usage information includes runs of test scenarios and/or the usage information is derived from analysis of runs of test scenarios. In one example, organizations that have a certain number of modules in common (e.g., at least 100 software modules are the same), and/or a certain proportion of their modules in common (e.g., at least 50% of the software modules used by the organizations), are considered similar. In another example, organizations that have instantiations of the same test scenarios associated with them are considered similar. For example, if for two organizations, at least 10% of the runs of test scenarios associated with each organization are instantiated from the same test scenarios, then the two organizations may be considered similar.

Determining similarity of the certain organization to the different organization may be based on one or more of the aforementioned factors. For example, similarity may be based both on field of operation of the organizations and usage data of the organizations. In another example, both usage data and lists of modules utilized by each organization and descriptions of screens in business processes utilized by each organization are used to determine the similarity.

In some embodiments, the certain description 191a and the descriptions 191b may be converted to feature values. Optionally, the feature values may be represented as vectors. In one example, similarity between vectors representing descriptions is determined based on vector similarity metrics such as got-product or Pearson correlation. In another example, similarity is determined based on proximity in a space of the vectors. For example, a nearest neighbor search may be performed to find similar vectors. Optionally, a certain number of organizations with corresponding vectors that are most similar to a vector representing the certain description 191a are considered similar to the certain organization. Optionally, organizations whose corresponding vector is within a certain distance (e.g., within a certain radius) from a vector representing the certain description 191a, are considered similar to the certain organization.

In one embodiment, the processor 192 is also configured to identify a second run of the specific test scenario, and the template generator 194 is also configured to generate the test scenario template based on the second run. The generated test scenario template identifies a transaction used by the run of the specific test scenario and the second run of the specific test scenario, and possible values for running the transaction. Optionally, at least one of the possible values for running the transaction does not appear in each of the runs. Optionally, the test scenario template includes a combination of values which does not appear in any of the runs.

In another embodiment, the processor 192 is also configured to identify a second run of a second test scenario (that is different from the specific test scenario), and the template generator 194 is also configured to generate the test scenario template based on the second run. The generated test scenario template identifies a transaction used by the runs, and possible values for running the transaction.

It is to be noted that different embodiments may implement components of the computer system illustrated in FIG. 2 in different ways. For example, in some embodiments one or more of the following may be implemented as software modules running on the processor 192: the monitoring module 190, the template generator 194, the data cleaner 196, the customization module 197, and the user interface 198. Additionally, one or more of the aforementioned components may be implemented on a remote server, such as a cloud-based server. Optionally, one or more of the aforementioned modules may be realized, at least in part, by the same software module.

In one example, the customization module 197 and/or the data cleaner 196 are both implemented as part of the template generator 194. In another example, the monitoring module 190 is realized at least in part as a software module that runs on Additionally, the monitoring module 190, may be implemented at least in part as a remote service (e.g., a cloud-based service) that receives data obtained from the monitoring.

In one embodiment, the test scenario template undergoes customization by the customization module 197 prior to removal of proprietary data from the template by the data cleaner 196. In another embodiment, the order is reversed: proprietary data is removed from the template by the data cleaner 196, and then the template is customized by the customization module 197. In still another embodiment, customizing the template and removing proprietary data from it are performed by the same software module. Optionally, the software module utilizes the certain description 191a and/or the descriptions 191b to determine which proprietary data needs to be removed from the template, and which proprietary data should be added to the template when customizing it.

Figure 3:
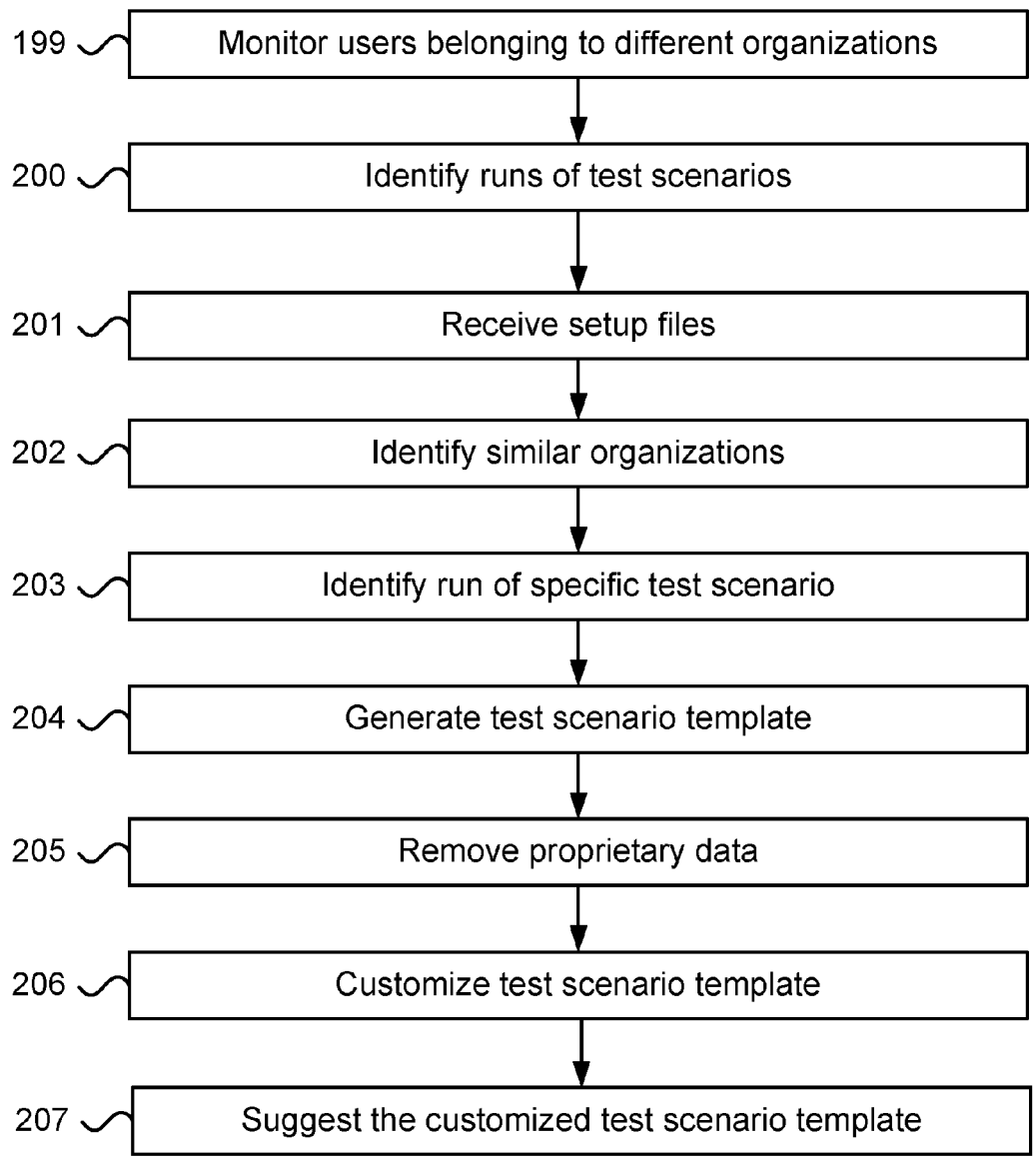
FIG. 3 illustrates one embodiment of a computer implemented method for generating a test scenario template based on similarity between setup files associated with different organizations.

FIG. 3 illustrates one embodiment of a computer implemented method for generating a test scenario template based on similarity between setup files associated with different organizations. The illustrated embodiment includes the following steps:

In step 200, identifying runs of test scenarios run by users on software systems that belong to the different organizations. Each organization of the different organizations is associated with a different setup file customized for the organization.

In step 201, receiving the setup files and a certain setup file associated with a certain organization.

In step 202, identifying, based on similarity between the certain setup file and the setup files, similar organizations which are similar to the certain organization.

In step 203, identifying a run of a specific test scenario that is utilized by one or more of the similar organizations.

In step 204, generating the test scenario template based on the run of the specific test scenario. Optionally, the specific test scenario was not available in any test suite of the certain organization prior to generating the test scenario template.

And in step 205, removing from the test scenario template proprietary data associated with at least one of the similar organizations. Optionally, not all the proprietary data associated with at least one of the similar organizations is removed. Therefore, after removing from the test scenario template proprietary data associated with at least one of the similar organizations, the test scenario template may still contain certain proprietary data associated with at least one of the similar organizations.

In one embodiment, the computer implemented method includes an additional optional step 206, which involves customizing the test scenario template by adding to the test scenario template proprietary data relevant to a user. Additionally, the computer implemented method may include an additional optional step 207 involving suggesting to the user to run an instantiation of the test scenario template. For example, the user interface 189 may utilized to present the template to a user belonging to the certain organization.

In one embodiment, customizing the test scenario template in step 206 involves utilizing data included in the certain setup file 181a for customizing the test scenario template for the certain organization. For example, values included in the certain setup file 181a may be placed in the template instead of values that came from runs associated with other organizations.

In another embodiment, customizing the test scenario template for the certain organization in step 206 also involves guiding a user to provide proprietary data relevant to the certain organization. Optionally, guiding the user to provide proprietary data may involve: providing to the user the test scenario template from which proprietary data associated with at least one of the similar organizations was removed, prompting the user to provide missing values, and recording the user inputs. Optionally, customizing the test scenario template for the certain organization is done by adding at least one of the recorded user inputs to the test scenario template from which proprietary data associated with at least one of the similar organizations was removed. Optionally, guiding the user to provide proprietary data comprises semiautomatic execution of an instantiation of the test scenario template from which proprietary data associated with at least one of the similar organizations was removed.

In one embodiment, the computer implemented method illustrated in FIG. 3 includes an additional optional step of receiving proprietary data associated with a certain user. Customizing the test scenario template for the certain organization may then take place by adding to the test scenario template at least some of the received proprietary data associated with the certain user. Optionally, the received proprietary data associated with the certain user is generated from previously recorded runs of test scenarios associated with the certain user. Optionally, the received proprietary data associated with the certain user is generated by parsing manual test scenarios associated with the certain user. Optionally, the received proprietary data associated with the certain user is generated from analysis of a database of the software system associated with the certain user. For example, analyzing the database system may yield certain values associated with the certain user that may be used for customizing the template.

In one embodiment, step 205 which involves removing from the test scenario template proprietary data includes selecting a value derived from the test scenario template. Following that, removing the selected value from the test scenario template if the selected value appears in less than a first predetermined number of the runs of test scenarios or the selected value appears in runs of test scenarios associated with less than a second predetermined number of different organizations. In this embodiment, both the first predetermined number and the second predetermined number are greater than one.

In another embodiment, step 205 which involves removing from the test scenario template proprietary data includes: selecting a value appearing in the run of the specific test scenario; testing whether the value appears in at least a first predetermined number of the runs of the test scenarios; testing whether the value appears in runs that are associated with at least a second predetermined number of different organizations; and if both conditions are positive, enabling customization of the test scenario template to utilize the selected value. Optionally, if at least one of the aforementioned conditions is negative, customization of the test scenario template is not allowed to utilize the selected value.

In one embodiment, the computer implemented method includes an additional optional step 199, which involves monitoring the users belonging to different organizations and providing data collected in the monitoring for the identifying of the runs of test scenarios.

In one embodiment, the computer implemented method illustrated in FIG. 3 includes an additional optional step that involves receiving usage data associated with the certain organization. Optionally, the usage data is utilized for identifying the run of the specific test scenario. Additionally or alternatively, the usage data may be utilized for identifying the similar organizations which are similar to the certain organization. In one example, usage data may be used to identify business processes utilized by the certain organization, database tables accessed by the certain organization, procedures and/or transactions executed by users belonging to the certain organization, and/or screens and/or forms utilized by the certain organization.

In one embodiment, the usage data is received from monitoring users belonging to the certain organization. The activities recorded in the usage data are compared with activities that characterize a test scenario utilized by one or more of the similar organizations (e.g., users belonging to the one or more similar organizations ran instantiations of the test scenario). If the comparison results in a close hit, the test scenario may be considered to be utilized by the certain organization; if the comparison does not result in a close hit, the test scenario may be considered not to be utilized by the certain organization.

In one embodiment, the computer implemented method illustrated in FIG. 3 includes an additional optional step that involves identifying an organization that is most similar to the certain organization, and selecting a run of a test scenario associated with the most similar organization as the run of the specific test scenario. For example, an organization that has the largest overlap in utilized business processes with the certain organization (as determined from comparing setup files), is identified. Following that, a test scenario that has many runs associated with the identified organization is selected as the specific test scenario.

Figure 4:
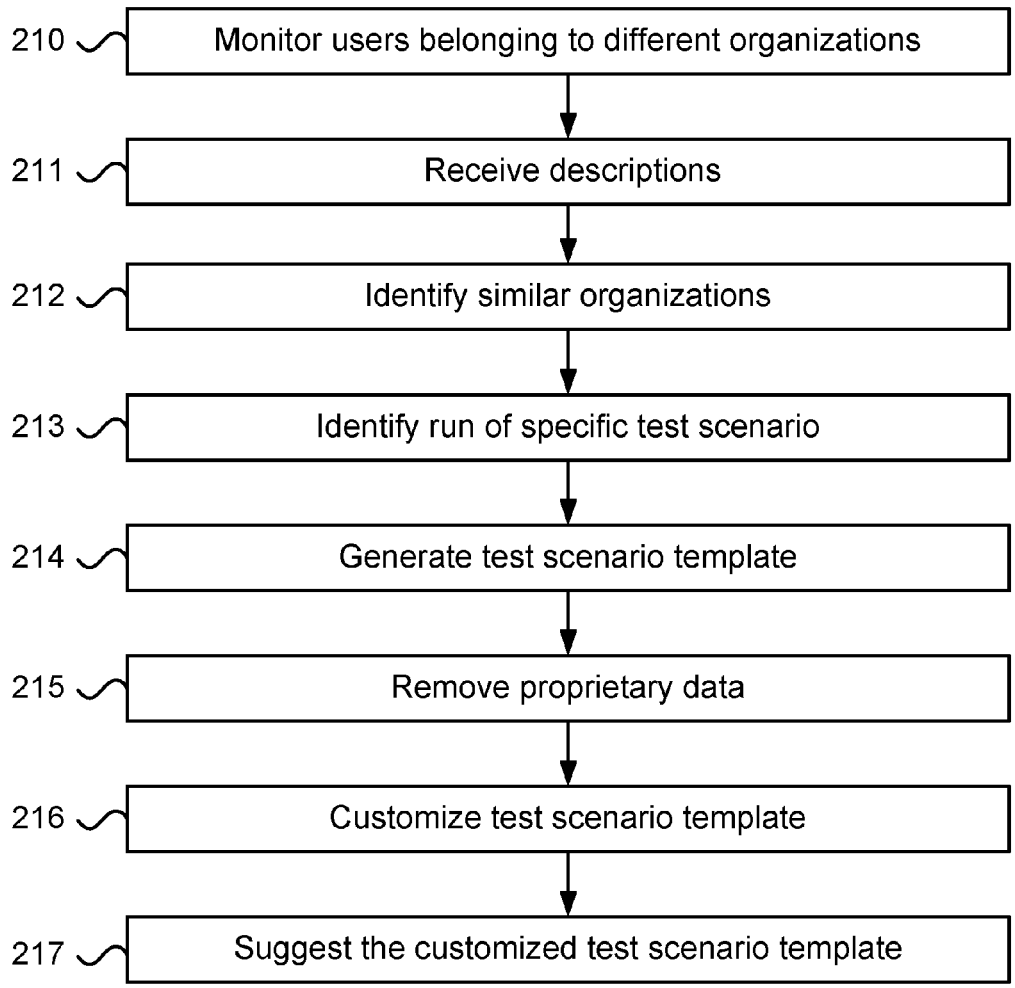
FIG. 4 illustrates a computer implemented method for generating a test scenario template based on similarity between descriptions with different organizations.

In one embodiment, the computer implemented method illustrated in FIG. 3 includes an additional optional step that involves identifying a second run of the specific test scenario, which is not utilized by the certain organization, and the generating of the test scenario template is also based on the second run of the specific test scenario. Additionally, the test scenario template identifies a transaction used by the run of the specific test scenario and the second run of the specific test scenario, and possible values for running the transaction. Optionally, at least one of the possible values for running the transaction does not appear in each of the run of the specific test scenario and the second run of the specific test scenario. Optionally, the test scenario template includes a combination of the possible values, and the combination does not appear in any of the run of the specific test scenario and the second run of the FIG. 4 illustrates a computer implemented method for generating a test scenario template based on similarity between descriptions with different organizations. The illustrated embodiment includes the following steps:

In step 210, monitoring users belonging to different organizations to identify runs of test scenarios run on software systems belonging to the different organizations.

In step 211, receiving a certain description of a certain organization and descriptions of the different organizations. Optionally, the certain description comprises a field of operation of the certain organization. Optionally, the certain description and the descriptions include usage information. In one example, usage identifies the business processes utilized by the certain organization. In another example, usage information identifies database tables accessed by the certain organization and/or the different organization. In yet another example, usage information may describe procedures, transactions, screens, and/or forms utilized by the certain organization and/or the different organizations.

In step 212, identifying, based on similarity between the certain description and the descriptions, similar organizations that are similar to the certain organization.

In step 213, identifying a run of a specific test scenario that is utilized by one or more of the similar organizations. Optionally, the specific test scenario was not available in any test suite of the certain organization prior to generating the test scenario template.

In step 214, generating the test scenario template based on the run of the specific test scenario And in step 215, removing from the test scenario template proprietary data associated with at least one of the similar organizations. Optionally, not all the proprietary data associated with at least one of the similar organizations is removed. Therefore, after removing from the test scenario template proprietary data associated with at least one of the similar organizations, the test scenario template may still contain certain proprietary data associated with at least one of the similar organizations.

In one embodiment, the method illustrated in FIG. 4 also includes an optional step of identifying an organization that is most similar to the certain organization. Additionally, identifying the run of the specific test scenario in step 213 involves selecting an instantiation of a test scenario associated with the most similar organization as the run of the specific test scenario.

In one embodiment, the method illustrated in FIG. 4 also includes an optional step of identifying a second run of the specific test scenario, which is not utilized by the certain organization. Additionally, generating of the test scenario template is also based on the second run of the specific test scenario. The test scenario template identifies a transaction used by the run of the specific test scenario and the second run of the specific test scenario, and possible values for running the transaction. Optionally, at least one of the possible values for running the transaction does not appear in each of the run of the specific test scenario and the second run of the specific test scenario. Optionally, the test scenario template includes a combination of the possible values, and the combination does not appear in any of the run of the specific test scenario and the second run of the specific test scenario.

In one embodiment, the computer implemented method includes an additional step 216, which involves customizing the test scenario template by adding to the test scenario template proprietary data relevant to a user. Additionally, the computer implemented method may include an additional step 217 involving suggesting to the user to run an instantiation of the test scenario template. For example, the user interface 198 may utilized to present the template to a user belonging to the certain organization.

In one embodiment, step 215 which involves removing from the test scenario template proprietary data includes selecting a value derived from the test scenario template. Following that, removing the selected value from the test scenario template if the selected value appears in less than a first predetermined number of the runs of test scenarios or the selected value appears in runs of test scenarios associated with less than a second predetermined number of different organizations. In this embodiment, both the first predetermined number and the second predetermined number are greater than one. Additionally or alternatively, removing from the test scenario template proprietary data may also involve: selecting a value appearing in the run of the specific test scenario; testing whether the value appears in at least a first predetermined number of the runs of the test scenarios; testing whether the value appears in runs that are associated with at least a second predetermined number of different organizations; and if both conditions are positive, enabling customization of the test scenario template to utilize the selected value. Optionally, if at least one of the aforementioned conditions is negative, customization of the test scenario template is not allowed to utilize the selected value.

In one embodiment, identifying the run of the specific test scenario template involves clustering runs of test scenarios associated with the similar organizations into clusters of similar runs of test scenarios. Following that, selecting a cluster from the clusters of similar runs of test scenarios. For example, the selected cluster may be selected from among the larger clusters and/or it may be a one of the clusters containing runs of test scenarios associated with a large number of the similar organizations. Additionally, generating the test scenario template involves obtaining from the selected cluster the run of the specific test scenario.

In one example, the run of the specific test scenario is a run which returns the shortest distance according to a distance function operating on runs of test scenarios belonging to the selected cluster. Optionally, the distance function measures a distance between pairs of runs of test scenarios in the selected cluster, and a run having a minimal average distance from other runs in the selected cluster is selected as the run of the specific test scenario.

In another example, the specific test scenario is one of the most popular test scenarios from among test scenarios with runs belonging to the selected cluster. Optionally, popularity of a test scenario is proportional to the number of users who used it (i.e., ran it). Optionally, popularity of a test scenario is proportional to the number of organizations that have users who used it.

In one embodiment, a non-transitory computer-readable medium stores program code that may be used by a computer to generate a test scenario template based on similarity between descriptions of different organizations. The computer includes a processor, and the non-transitory computer-readable medium stores the following program code:

Program code for monitoring users belonging to different organizations to identify runs of test scenarios run on software systems belonging to the different organizations.

Program code for receiving a certain description of a certain organization and descriptions of the different organizations. Optionally, the certain description comprises a field of operation of the certain organization.

Program code for identifying, based on similarity between the certain description and the descriptions, similar organizations that are similar to the certain organization.

Program code for identifying a run of a specific test scenario that is utilized by one or more of the similar organizations.

Program code for generating the test scenario template based on the run of the specific test scenario. Optionally, the specific test scenario was not available in any test suite of the certain organization prior to generating the test scenario template.

And program code for removing from the test scenario template proprietary data associated with at least one of the similar organizations.

In one embodiment, the non-transitory computer-readable medium also stores program code for customizing the test scenario template for the certain organization.

In some embodiments, vendor-customized packaged application modules are modules designed and developed to include many options and possibilities in various aspects which can be customized. During the installation and implementation at a customer, the modules may be customized. One possibility to implement a customization to a module is by developing additional code which is added as part of the packaged application. Optionally, the additional code is organization-specific and/or developed by the organization. Another possibility to implement a customization is via setting some configurable option, for example by adding, removing, and/or editing configuration elements belonging to a configuration file associated with a module.

A customization of a module may change the way a business process associated with the module works without changing the code itself. In one example, one may configure a module that deals with human resources of a certain organization by providing it with organization-specific list of levels (titles) of the certain organization. Thus, when a user of the certain organization runs human resources-related business processes, the user may utilize a different list of levels than a user of another organization utilizes, even though they both may be running the same version of application code. In another example, one organization may require a direct manager of an employee to add a summary of an interview of a new employee, while another organization may not have such a requirement. Customizing an application module for the requirement to add a summary may be accomplished by adding code that requests an input of a summary after an interview, and integrating the code in to a business process that involves adding a new employee.

In one embodiment, a customization to a module may involve adding data that a user may be required to enter when interacting with the module. For example, a customization may enter certain organization-specific data (e.g., name of organization, address, account number). Thus, for example, a user of the module would not have to enter the data when running each test scenario. Optionally, the user may be given an opportunity to approve and/or edit data associated with a customization. Additionally or alternatively, a customization to a module may involve information that is required for a test scenario that involves the module to run smoothly. Optionally, without the information being provided, the test scenario would not run smoothly (e.g., leading to errors in execution of the test scenario). For example, for a test scenario to run smoothly may requires a customization that provides information such as location of resources (e.g., directories or databases), and/or certificates or permissions to access certain resources.

In one embodiments, customizations of an organization to a module may indicate usage of the module by the organization. It is often the case that a software system of a certain organization may include many vendor-customized packaged application modules (e.g., a standard collection of application modules). However, a certain organization may not utilize all of the installed modules. The certain organization may utilize other solutions instead of the modules. For example, the certain organization may utilize SalesForce™ Customer Relationship Management (CRM) instead of corresponding module of SAP™ that is installed. In this case, providing a user belonging to the certain organization test scenarios for testing a CRM module of SAP is not beneficial.

Figure 5:
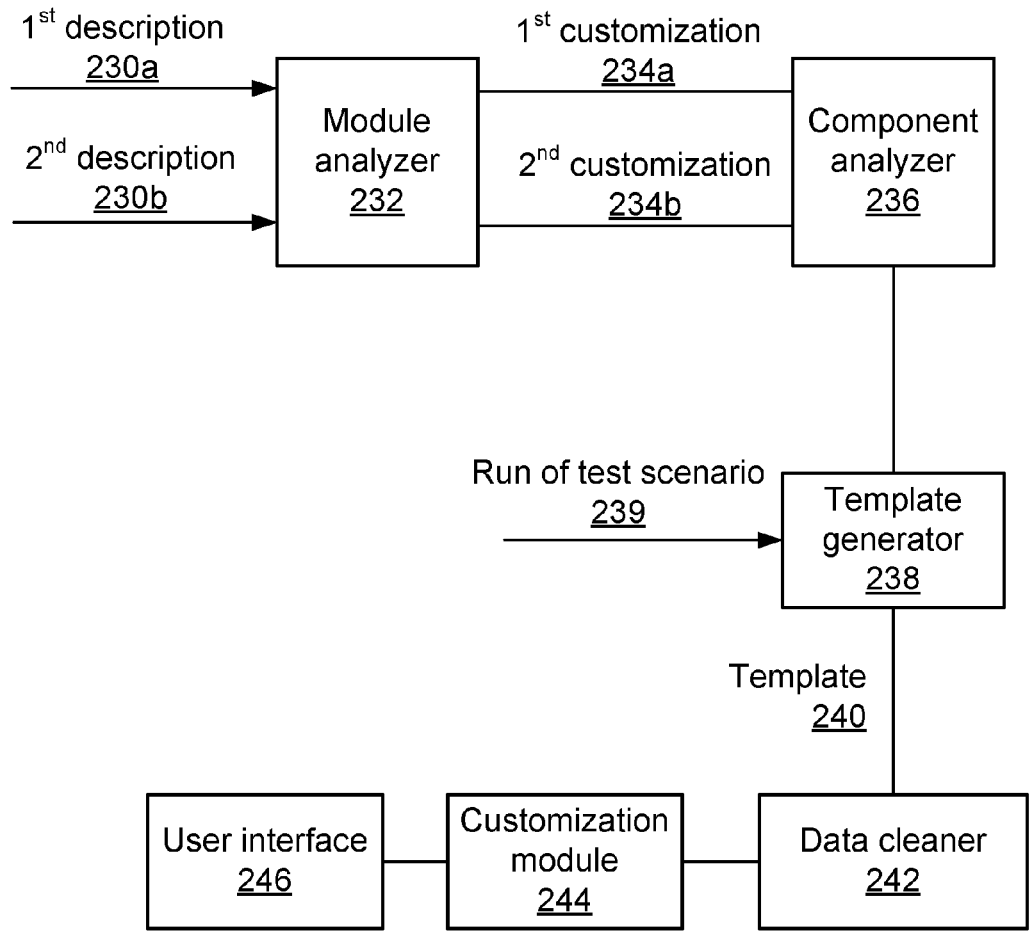
FIG. 5 illustrates one embodiment of a computer system configured to generate a test scenario template from data collected from users running test scenarios to test vendor-customized packaged application modules.

FIG. 5 illustrates one embodiment of a computer system configured to generate a test scenario template from data collected from users running test scenarios to test vendor-customized packaged application modules. The illustrated embodiment includes at least a module analyzer 232, a component analyzer 236, a template generator 238, and a data cleaner 242.

The module analyzer 232 is configured to receive: a first description 230a of a first set of vendor-customized packaged application modules, and a second description 230b of a second set of vendor-customized packaged application modules. Optionally, a first organization utilizes the first set of modules, and a second organization utilizes the second set of modules. Optionally, the first set of modules and the second set of modules each include at least one module. Optionally, the second set includes at least one module that is not included in the first set. Optionally, the first organization and the second organization are associated with the same field of operation. For example, both organizations may be in the travel industry. Alternatively, the first organization and the second organization may be associated with different fields of operation. For example, the first organization may be in the travel industry, while the second organization may be in the banking industry.

In one embodiment, the second organization is an organization that is most similar to the certain organization. For example, from among a plurality of different organizations, the second organization is the most similar to the first organization, based on one or more factors such as: field of operation, organizational hierarchy, lists of utilized modules, and/or customizations associated with the organizations.

The first description 230a includes customizations to modules belonging to the first set, and the second description 230b includes customizations to modules belonging to the second set. Optionally, each of the first description 230a and the second descriptions 230b may include customization code, settings to modules (e.g., configuration elements), default values utilized by modules, and/or information required for modules to run smoothly (e.g., resource locations, certificates, and/or permissions). Additionally or alternatively, the first description 230a and the second description 230b may also include information that characterizes the first and/or second organizations. In one example, the first description 230a and/or the second description 230b may include languages used by users belonging to the organization, location of the organization, size of the organization, and/or a field of operation of the organization (e.g., insurance, defense, communications). In another example, the first description 230a and/or the second description 230b may list modules, business processes, transactions, and/or screens utilizes by the first and/or second organizations. In yet another example, the first description 230a and/or the second description 230b may include usage data. Optionally, the usage data may include activity data of users of the first and/or second organizations, runs of test scenarios associated with the first and/or second organizations, and/or data derived from the runs.

The module analyzer 232 is also configured to identify, based on the first description 230a and the second description 230b, a first customization 234a to a first instance of a certain module and a second customization 234b to a second instance of the certain module. The first and second instances belong to the first and second sets, respectively. Optionally, the first and second instances involve essentially the same code base but different customizations may be associated with each instance. Optionally, the first and/or second descriptions explicitly refer to an instance of the certain module being used by their respective organizations; for example, the first description 230a and/or the second description 230b may list the certain module as being utilized by their respective organization. Optionally, the first description 230a and/or the second description 230b may imply that their respective organization utilizes an instance of the certain module. For example, the first description 230a and/or the second description 230b may include runs of test scenarios from which it may be implied that certain transactions, which involve the certain module, were run.

The first customization 234a and the second customization 234b selected by the module analyzer 232 are typically similar to each other. In one example, the first customization 234a includes customization code that is similar to customization code included in the second customization 234b. Optionally, similarity of customization code is determined via string comparisons and/or clustering of customization code. In another example, the first customization 234a and the second customization 234b involve similar data that may be used to customize the respective first and second instances of the certain module. For example, to customize and instant of a inventory module, both customizations provide data of a similar types related to ordering parts for a warehouse (e.g., respective organization names, bank accounts, shipping options). In yet another example, the first customization 234a and the second customization 234b both describe information of their respective organizations that is required for test scenarios to run smoothly. For example, they describe resource locations (for similar resources), and/or provide similar certificates of their respective organizations. In another example, similar customizations each include at least one similar component in common.

The component analyzer 236 is configured to identify, based on the first customization 234a and the second customization 234b, components in the second instance that are similar to components in the first instance. Optionally, a component of a customization of a module may involve one or more of the following: a certain business process run on the module, a certain transaction run on the module, a certain field on a screen used by a certain transaction run on the module, a certain value used by a certain transaction run on the module, and a certain command executed when running the module. Optionally, a first customization and a second customization may be considered similar by virtue of at least one of: a similar business process being described in the first and second customizations, a similar transaction being described in the first and second customizations, a similar field on a screen used by a certain transaction being described in the first and second customizations, a certain value used by a certain transaction being described in the first and second customizations, and a certain command described in the first and second customizations.

In one example, the first customization 234a and the second customization 234b both include a shipping address for their respective organizations. In another example, the first customization 234a and the second customization 234b include code that alters behavior of a certain transaction; e.g., each customization alters what an instance of the certain module does with a record of a new employee after the record is added in the certain transaction. In yet another example, the first customization 234a and the second customization 234b each include certificates of their respective organizations required by the certain module in order to access a customer database of each organization.

The template generator 238 is configured to receive: a specific run 239 of a test scenario run to test the second instance, and a description of similar components that includes an indication of at least one component of the second instance that is similar to at least one component of the first instance. For example, the indication of the at least one component may be a name, an identifier, and/or a description of a business process; a name, identifier, code, and/or description of a certain transaction; a description of a screen or portions of a screen such as field names belonging to the screen; a certain value used by a transaction; and/or a command executed when running a transaction.

The template generator 238 is also configured to generate, based on the specific run 239 and the description of similar components, a test scenario template 240 for testing the first instance of the certain module. Optionally, the template 240 may focus on portions of the specific run that relate to the at least one component of the second instance that is similar to at least one component of the first instance. For example, the at least one component may be a certain transaction, and the template may primarily involve testing the certain transaction. In another example, the at least one component may include values utilized to run a transaction, e.g., the values entered in a screen, and the template may include essentially the same screen and utilize the same values as default values for the screen. In yet another example, the at least one component may be a certificate for accessing an external website, and the template includes a transaction that accesses the external website.

In one embodiment, the template generator 238 is configured to select the run of a test scenario run to test the second instance from a plurality of runs of test scenarios that were run to test the second instance. For example, the template generator 238 may select the second run based on similarity of the second run to the specific run 239. In another example, the template generator 238 may select the second run based on the fact that it involves the at least one component of the second instance that is similar to at least one component of the first instance, and that the second run is an instantiation of a test scenario run by many users belonging to the second organization.

In another embodiment, the template generator 238 is also configured to rank popularity of runs of test scenarios, run to test the second instance, and to select the specific run of a test scenario run to test the second instance from popular runs of popular test scenarios. For example, the runs may be ranked according to popularity of the test scenarios and/or the template of which the runs are instantiations. Optionally, the popularity of the test scenarios and/or templates may be determined based on the number of users that ran instantiations of the test scenarios and/or templates, and/or the number of organizations associated with instantiations of the test scenarios and/or the templates. In one example, the second run is selected from among the top 20% of most popular runs. In another example, the second run is the most popular run that involves the at least one component of the second instance that is similar to at least one component of the first instance.

In one embodiment, the template generator 238 is configured to receive a second run of a test scenario run to test the second instance of the certain module. Optionally, the template generator 238 is configured to select the second run from among runs of test scenarios associated with the second organization. The template generator 238 is configured to generate the test scenario template 240 based on the second run (in addition to the specific run 239). Optionally, the template 240 identifies a transaction used by the specific run and the second run, and possible values for running the transaction. Optionally, at least one of the possible values for running the transaction is not used in any of the specific run 239 and the second run. Optionally, the test scenario template 240 includes a combination of the possible values, and the combination is not used in any of the specific run 239 and the second run.

The data cleaner 242 is configured to remove from the test scenario template 240 proprietary data associated with the second organization. Additionally or alternatively, the data cleaner 242 may be configured to remove from the specific run 239 of the test scenario proprietary data associated with the second organization. Optionally, most output fields of the specific run are removed, and as a result, the test scenario template 240 does not include expected values for most test steps.

In one embodiment, the computer system optionally includes a customization module 244 that is configured to customize the test scenario template by adding to the test scenario template proprietary data relevant to the first organization. Optionally, at least some of the proprietary data is obtained from the first description 230a.

In another embodiment, the computer system optionally includes a user interface 246 that is configured to suggest to a user to run an instantiation of the template. Optionally, the user interface 246 may initiate an instantiation of the template. For example, the user interface 246 may present a first screen of the customized template and prompt the user to take a certain action to advance execution.

It is to be noted that different embodiments may implement components of the computer system illustrated in FIG. 5 in different ways. For example, in some embodiments one or more of the following may be implemented by the same software module and/or software modules running on the same processor: the module analyzer 232, the component analyzer 236, the template generator 238, the data cleaner 242, the customization module 244, and the user interface 246. Additionally, one or more of the aforementioned components may be implemented on a remote server, such as a cloud-based server.

In one example, the customization module 244 and/or the data cleaner 242 are both implemented as part of the template generator 238. In another example, the component analyzer 236 and the module analyzer 232 are both implemented by the same software module.

In one embodiment, the test scenario template undergoes customization by the customization module 244 prior to removal of proprietary data from the template by the data cleaner 242. In another embodiment, the order is reversed: proprietary data is removed from the template by the data cleaner 242, and then the template is customized by the customization module 244. In still another embodiment, customizing the template and removing proprietary data from it are performed by the same software module. Optionally, the software module utilizes the first description 230a and/or the second description 230b to determine which proprietary data needs to be removed from the template 240, and which proprietary data should be added to the template 240 when customizing it.

Figure 6:
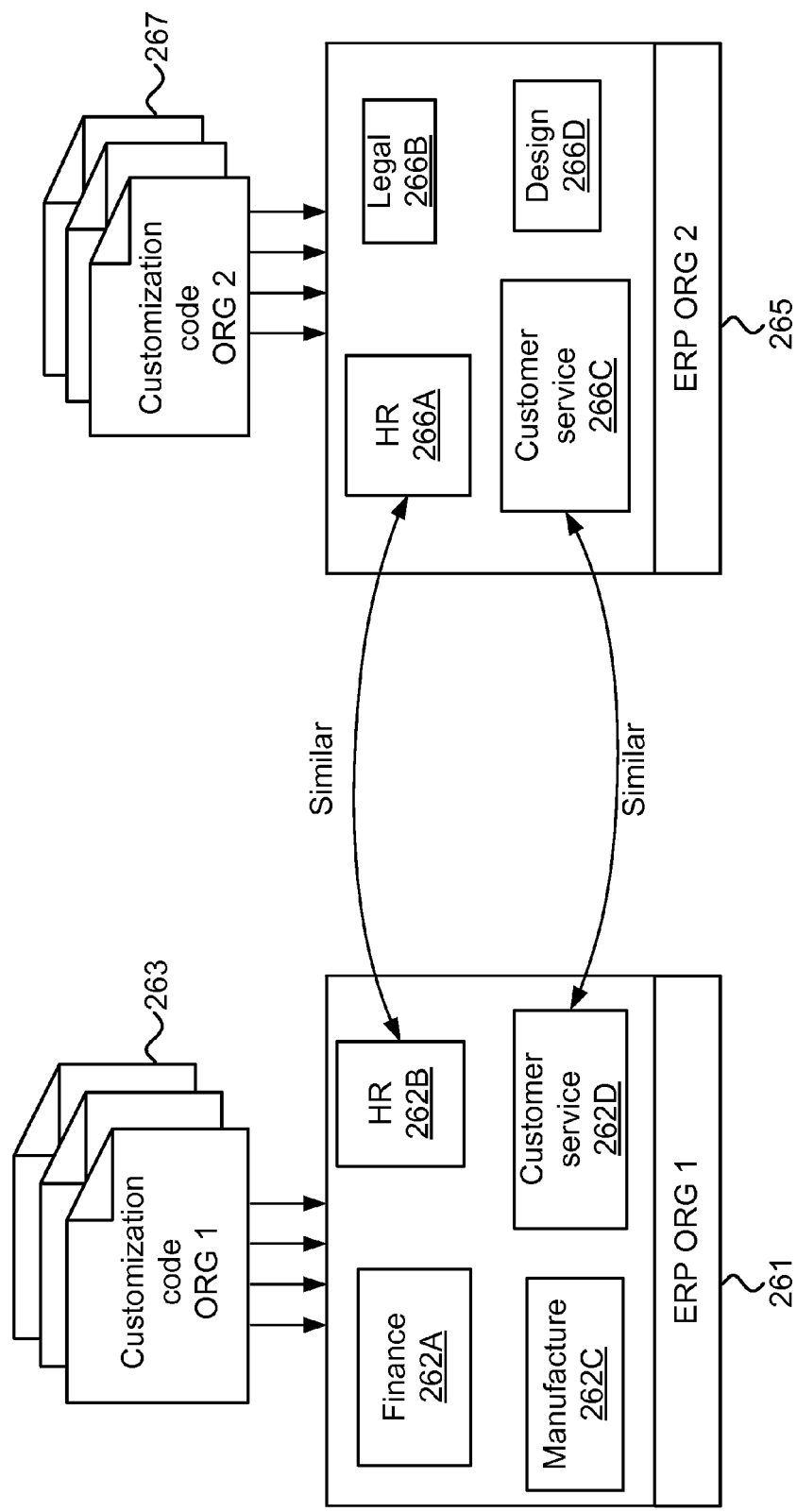
FIG. 6 illustrates similar modules detected based on descriptions of two organizations.

FIG. 6 illustrates similar modules detected based on descriptions of two organizations. In the illustration, each organization is associated with an ERP that includes vendor-customized packaged application modules (a first organization is associated with ERP 261 and a second organization is associated with ERP 265). Each ERP is customized by organization-specific customization code (the ERP of the first organization is customized by code 263 and the second ERP is customized by code 267). The description of the first ERP indicates which modules it includes; among them are finance 262A, human resources 262B, manufacture 262C, and customer service 262D. The description of the second ERP indicates which modules it includes; among them are human resources 266A, legal 266B, customer service 266C, and design 266D. Based on the first and second descriptions, and the customization code associated with the two organizations, it is determined that modules 262B and 266A are similar instances of a human resources module. In addition, it is determined that modules 262D and 266C are similar instances of a customer service module. Thus, a run of a test scenario of a user of the second organization that tests at least one of the modules 266A and 266C, may be utilized to generate a template for the first organization, that tests module 262B and/or 262D.

Figure 7:
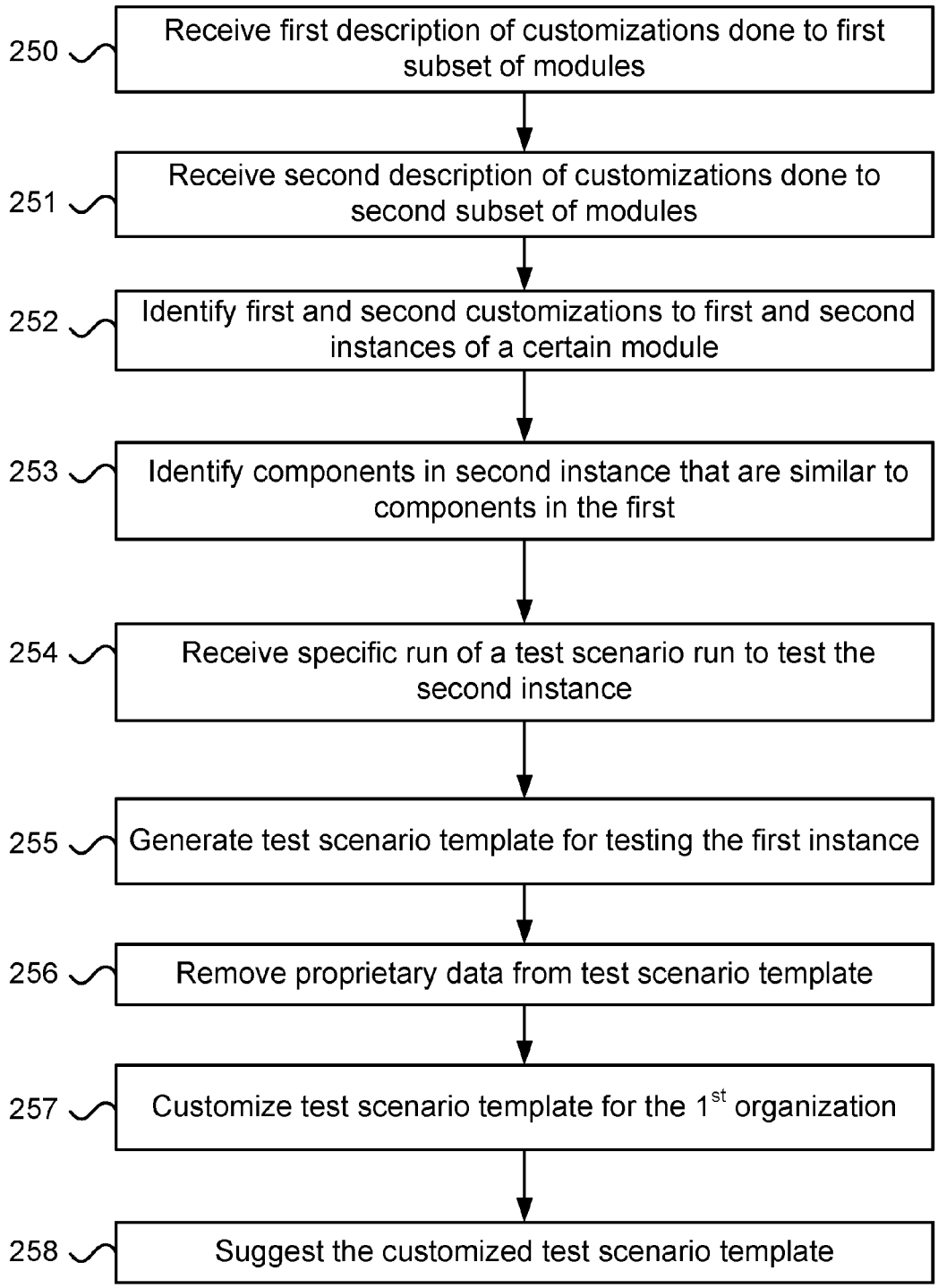
FIG. 7 illustrates one embodiment of a computer implemented method for generating a test scenario template from data collected from users running test scenarios to test vendor-customized packaged application modules.

FIG. 7 illustrates one embodiment of a computer implemented method for generating a test scenario template from data collected from users running test scenarios to test vendor-customized packaged application modules. The illustrated embodiment includes the following steps:

In step 250, receiving a first description of a first set of instances vendor-customized packaged application modules. A first organization uses the first set of modules and the first description includes customizations to modules from the first set.

In step 251, receiving a second description of a second set of instances vendor-customized packaged application modules. A second organization uses the second set of modules and the second description includes customizations to modules from the second set. Optionally, the second set includes at least one module that is not included in the first set. Optionally, the first organization and the second organization are associated with different fields of operation. Alternatively, the first organization and the second organization may be associated with a same field of operation.

In one embodiment, steps 250 and 251 are performed simultaneously. For example, the first and second descriptions are received in a same message (e.g., the same file).

In step 252, identifying, based on the first and second descriptions, a first customization to a first instance of a certain module and a second customization to a second instance of the certain module. Optionally, the first and second instances belong to the first and second sets, respectively. In addition, the first customization is similar to the second customization.

In step 253, identifying, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

In step 254, receiving a specific run of a test scenario run to test the second instance, and a description of similar components that includes an indication of at least one component of the second instance that is similar to at least one component of the first instance.

In step 255, generating, based on the specific run and the description of similar components, a test scenario template for testing the first instance.

And in step 256, removing from the test scenario template proprietary data associated with the second organization.

In one embodiment, generating the template in step 255 also involves selecting the specific run of a test scenario run to test the second instance from runs of test scenarios that were run to test the second instance. Alternatively or additionally, generating the template in step 255 may involve ranking popularity of runs of test scenarios, run to test the second instance, and selecting the specific run of a test scenario run to test the second instance from popular runs of test scenarios.

In one embodiment, the computer implemented method illustrated in FIG. 7 includes an optional step of receiving a second run of a test scenario run on the second instance of the certain module; generating the test scenario template is based both on the specific run and the second run. As a result, the test scenario template identifies a transaction used by the specific run and the second run, and possible values for running the transaction. Optionally, at least one of the possible values for running the transaction is not used in any of the specific run and the second run. Optionally, the test scenario template includes a combination of the possible values, and the combination is not used in any of the specific run and the second run.

In one embodiment, the computer implemented method illustrated in FIG. 7 includes an optional step of removing proprietary data from the specific run; most output fields of the specific run are removed, and as a result, the test scenario template does not include expected values for most test steps.

In one embodiment, the computer implemented method includes optional step 257 which involves customizing the test scenario template for the first organization by adding to the test scenario template proprietary data relevant to the first organization.

Optionally, customizing the test scenario template for the first organization involves guiding a user to provide proprietary data relevant to the first organization. Optionally, guiding the user to provide proprietary data involves: providing to the user the test scenario template from which proprietary data associated with the second organization was removed, prompting the user to provide missing values, and recording a response of the user. Optionally, customizing the test scenario template for the first organization may involve adding the response of the user to the test scenario template from which proprietary data associated with the first organization was removed.

In one embodiment, guiding the user to provide proprietary data may involve semiautomatic execution of an instantiation of the test scenario template from which proprietary data associated with the second organization was removed. Additionally or alternatively, proprietary data of the first organization may be removed from the template. Additionally, customizing the test scenario template for the first organization may involve marking locations of values that were removed from the test scenario template; the guiding of the user to provide the proprietary data may involve directing the user's attention to the marked locations.

In one embodiment, the computer implemented method illustrated in FIG. 7 includes an optional step of receiving proprietary data associated with the first organization. Additionally, customizing the test scenario template for the first may involve adding to the test scenario template at least some of the received proprietary data associated with the first organization. Optionally, the received proprietary data associated with the first organization is generated from a previously recorded run of a test scenario associated with the first organization. Optionally, the received proprietary data associated with the first organization is generated by parsing manual test scenarios associated with the first organization. Optionally, the received proprietary data associated with the first organization is generated from analysis of a database of the software system associated with the first organization.

In one embodiment, the computer implemented method includes optional step 258 involving suggesting to a user to run an instantiation of the test scenario template.

In one embodiment, a non-transitory computer-readable medium stores program code that may be used by a computer to generate a test scenario template from data collected from users running test scenarios to test vendor-customized packaged application modules. The computer includes a processor, and the non-transitory computer-readable medium stores the following program code:

Program code for receiving a first description of a first set of instances vendor-customized packaged application modules. A first organization uses the first set and the first description comprises customizations to modules from the first set.

Program code for receiving a second description of a second set of instances vendor-customized packaged application modules. A second organization uses the second set and the second description comprises customizations to modules from the second set. Optionally, the second set includes at least one module that is not included in the first set.

Program code for identifying, based on the first and second descriptions, a first customization to a first instance of a certain module and a second customization to a second instance of the certain module; the first and second instances belongs to the first and second sets, respectively. Additionally, the first customization is similar to the second customization;

Program code for identifying, based on the first and second customizations, components in the second instance that are similar to components in the first instance. Optionally, a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

Program code for receiving a specific run of a test scenario run to test the second instance, and a description of similar components comprising an indication of at least one component of the second instance that is similar to at least one component of the first instance.

Program code for generating, based on the specific run and the description of similar components, a test scenario template for testing the first instance.

And program code for removing from the test scenario template proprietary data associated with the second organization.

In one embodiment, the non-transitory computer-readable medium optionally stores program code for r ranking popularity of runs of test scenarios run to test the second instance of the certain module, and selecting the specific run from the most popular results.

In one embodiment, the non-transitory computer-readable medium optionally stores program code for customizing the test scenario template for the first organization.

Monitoring Users and Identifying Runs

Some of the disclosed embodiments involve software systems that may be characterized as being data-oriented large-scale software systems. Examples of data-oriented large-scale software systems include Enterprise Resource Planning (ERP), such as from the following trademarks: SAP, Oracle Application, The Sage Group, Microsoft Dynamics, and SSA Global Technologies; billing systems (also known as revenue management) such as from the following trademarks: Amdocs, Comverse Inc., and Convergys Corporation; service management systems; and portfolio management systems. Installing, upgrading, and/or maintaining such systems require running many tests in order to validate the systems' behavior.

In this disclosure, users are often referred to as being monitored. This monitoring typically concerns activity of the user on a software system being tested. A monitored user may be a human (e.g., performing a certain test) and/or a system module (e.g., a module initiating the running of a certain procedure).

In one embodiment, a test scenario refers to a functional and/or a technical specification for testing a business process and/or one or more transactions. A test scenario may specify how to test one or more business processes, business requirements, test conditions, logical data, and/or expected results of tests.

In one embodiment, runs of test scenarios are identified and/or obtained based on data collected from monitoring users. For example, monitoring of a user may involve collection of data related to inputs provided by a user to a system, along with the transactions that were run, and results of the transactions. This data may be used to identify runs of test scenarios that describe test steps taken by a user and a result of executing the test steps on the software system.

In another embodiment, monitoring a user is done in order to obtain activity data of a user on a software system. The activity data may include data related to inputs provided by the user and/or other sources to the software system, outputs generated by the software system, and/or intermediate values generated by the software system (e.g., temporary files generated by the system, network traffic of the system, and/or content of memory belonging to the system). Optionally, the activity data may be utilized in order to identify runs of test scenarios.

In some embodiments, users perform at least part of their interaction with a software system via a user interface that includes a display that displays screens. Optionally, a screen may refer to a presentation of a certain form through which a user may access, modify and/or enter data. Optionally, a screen includes one or more fields. Optionally, a field may have a certain name and/or identifier. Optionally, a field may have an associated value, which may be referred to herein as a "field value". The field value may or may not be presented on the screen. Optionally, the user is able to edit certain field values, while other field values may not be editable by the user. Optionally, certain field values may be required values, which the user must enter before completing a screen. Optionally, field values from a screen may correspond to one or more database entries. For example, a screen displaying customer details (e.g., name, address, telephone number) may correspond to a record of the customer in a customer database.

In one embodiment, monitoring users involves monitoring certain transactions and/or business processes that were executed by the users, as part of running test scenarios. Optionally, monitoring users may involve monitoring which programs executed by the users, along with invocation values of the users and/or return values of the programs.

In one embodiment, monitoring a user may involve recording and/or processing inputs the user provides to the software system (e.g., via a keyboard, mouse click, visual cue). Additionally or alternatively, the inputs may include digital data transmitted to the system (e.g., a file of digital data). In another example, monitoring a user may involve recording and/or processing outputs generated by the software system. Such outputs may include, values presented on a screen, written in a file, printed, and/or provided in the form of auditory cues. The outputs may be presented to the user and/or provided to other recipients. In yet another example, monitoring a user may involve utilization of internal state data of the software system; data that may not have been directly provided by the user and may also not be directly provided to the user (e.g., memory content, database activities, and/or network traffic).

In some embodiments, users performing tests may be given instructions and/or scripts describing some of the steps involved in a certain test (e.g., which procedures to run, what buttons to push, and/or what values to provide the system). Optionally, such instructions and/or scripts may be given in electronic form (e.g., a computer file or instructions on a screen) and may be recorded and/or processed as part of monitoring a user.

As described in some embodiments in this disclosure, monitoring a user running test scenarios on a software system may be performed by a monitoring module. Optionally, the monitoring module is, and/or utilizes, a software module that interacts with the software system on which the test scenarios are run, in order to obtain data related to activity of the user on the software system. Optionally, the monitoring module is implemented, at least in part, as part of the software system. For example, the monitoring module may include one or more programs that are part of a distribution of the software system. Additionally or alternatively, the monitoring module may be implemented, at least in part, separately from the software system. For example, the monitoring module may include programs that are not part of the software system (e.g., not included in a distribution of the software system). In another example, the monitoring module may include programs that run on hardware that does not run the programs belonging to the software system; e.g., the monitoring module may run programs on different servers than servers on which the software system runs programs. Optionally, the monitoring module is implemented, at least in part, on hardware remote from hardware that runs the software system. For example, a software system may run on hardware located at a certain organization, while the monitoring module may run, at least in part, on remote cloud-based servers that are not associated with the certain organization.

In some embodiments, the monitoring module may receive data from the software system that is intended for the monitoring module (e.g., the software system may explicitly send the monitoring module data describing activity on the software system). Additionally or alternatively, the monitoring module may intercept and/or examine data of the software system that is not intended primarily for the monitoring module. For example, the monitoring module may sniff network traffic that involves message exchange between modules of the software system as part of the normal operation of the software system.

In some embodiments, a run of a test scenario may include identifiers of business processes, transactions, and/or system commands that were executed while running the test scenario. Additionally or alternatively, a run of a test scenario may include values that were provided to a software system (e.g., input values in a screen), values generated by the software system (e.g., outputs from a transaction), and/or internal values of the software system (e.g., intermediate values generated by a transaction). Additionally or alternatively, a run of a test scenario may include state information about systems involved in running the test scenario (e.g., the state of certain system resources, and/or performance data such as CPU load or network congestion), and/or information about a user running the test scenario (e.g., organization affiliation, department, job title, permissions). Optionally, a certain test step, transaction, command or procedure is said to be described and/or included in a run of a test scenario if the run of the test scenario indicates that the certain test step, transaction, command, or procedure was executed as part of running the test scenario. Optionally, examining the run of the test scenario may reveal a value associated with the certain test step, transaction, command, or procedure. Additionally, examining the run of the test scenario may reveal a behavior of the system with respect to the certain test step, transaction, command, or procedure. For example, a run of a test scenario may indicate whether or not a certain transaction, involved in the running of the test scenario, produced an error message.

In one embodiment, identifying a run of a test scenario from data obtained from monitoring one or more users is done as part of the process of monitoring the users. For example, a user may be monitored for a session, which is a certain period of time that corresponds to running of a certain test scenario. Each session may start when the running of the certain test scenario starts (e.g., when a first screen is presented to a user), and may end when the running ends (e.g., after the user enters a last value involved in the test scenario). Thus, any data recorded during the session may be easily identified as belonging to a run of the certain test scenario.

In one embodiment, the action of monitoring a user and the action of identifying a run of a test scenario from data obtained from the monitoring are performed separately. For example, monitoring may generate bulk data corresponding to activity of one or more users. Identifying runs in the bulk data may require parsing the data to identify certain portions of interest, such as transactions executed by each of the users and/or inputs and outputs of each of the users. In one example, identifying runs involves detecting in the data obtained from monitoring signals that denote a start and/or end of a run. Optionally, the signals may be explicit, such as explicit tags in the data that denote a start of running a test and/or end of running a test scenario. Alternatively or additionally, the signals may be implicit. For example, a user entering data after not doing so for a while may signal a start of a run; while having a user stop entering data, and not entering further data for a prolonged period may signal an end of a run. In another example, the fact that a user performs a certain transaction may signal a start of a run, such as entering data in a screen labeled "begin new client record". Similarly, certain transactions may signal an end of a run, such as entering data in a screen labeled "finalize new client". In yet another example, identifying a run of a test scenario may involve selecting certain types of data and/or amounts of data that are to be included in the run. For example, while monitoring a user may involve collection of various types of data, in a certain system, runs of test scenarios may include only descriptions of screens presented to a user while interacting with the certain system. Thus, in this example, identifying runs may involve identifying and retaining descriptions of screens.

The process of identifying runs of test scenarios of a certain user may utilize, in some embodiments, data collected from other users. For example, determining boundaries of a test scenario, such as determining at what screen a run of the test scenario typically starts, and at what screen it ends, may be based on examination of data obtained from multiple users. In the examination of the data, certain common screens that appear in data from multiple users may be detected, and runs of test scenarios may be restricted to begin and/or end with a description of at least one of the common screens. Alternatively or additionally, identifying runs of test scenario run by a certain user, may involve examination of data obtained primarily from monitoring the certain user.

As described in some embodiments in this disclosure, identifying runs of test scenarios run by users on software systems may be performed by a test identifier. In some embodiments, the test identifier receives data from the monitoring module. Optionally, the test identifier and monitoring module are realized by the same software module and/or same hardware. In one example, one program may perform at least some of the operations involved in monitoring the users and identifying the runs. In another example, programs that perform at least some of the operations involved in monitoring the users and identifying the runs of test scenarios, run on the same servers.

In one embodiment, the monitoring module runs, at least in part, on hardware that is different from hardware on which at least some of the actions of the test identifier are performed. For example, a monitoring module that monitors users belonging to a certain organization may run, at least in part, on servers belonging to the certain organization. However, a test identifier, which receives data from the monitoring module, may run on remote servers belonging to, or controlled by, a different organization, such as an organization that provides analysis services to the certain organization.

Crowd Testing Data

Some aspects of this disclosure involve utilization of runs of test scenarios run by users belonging to, or associated with, different organizations. Optionally, a group of users running test scenarios may be referred to as a "crowd" or "crowd users". Optionally, crowd users do not run test scenarios in a coordinated effort, such as users belonging to different organizations that do cooperate to run test scenarios to test a certain software system that belongs to a certain organization, or users making a coordinated effort to test certain aspects of their software systems. Rather, as typically used in this disclosure, the users belonging to the different organizations run test scenarios to test software systems of their respective organizations, and do so essentially independently of each other.

In some embodiments, a first organization and second organization are considered different organizations if the first organization has a different ownership structure (e.g., a different composition of shareholders) than the second organization. Additionally or alternatively, two organizations may be considered different organizations if they have different employees, and/or different members of management.

In one embodiment, a user may be considered to belong to an organization and/or may be considered to be associated with the organization, if the user has a certain relationship with the organization such as being an employee of the organization, a member of the organization, and/or contracted to work for the organization. Additionally or alternatively, a user may belong to an organization, and/or be associated with the organization, if the worker performs work that is directly or indirectly done on behalf of the organization. For example, an employee of a first organization may be considered associated with a second organization if the employee runs, as part of her duties, tests that involve a system of the second organization. As used herein, the terms "associated" and "belongs" may be used interchangeably when referring to a user being associated with an organization or a user belonging to an organization.

Some aspects of this disclosure involve utilization of runs of test scenarios run on software systems belonging to different organizations and/or associated with the different organization. Optionally, a software system may be considered to belong to a certain organization and/or may be considered to be associated with a certain organization if the software system runs, at least in part, on hardware belonging to the organization and/or paid for by the organization (e.g., software running on cloud-based servers billed to the organization). Additionally or alternatively, a software system may be considered to belong to an organization and/or be associated with the organization if a user from the organization runs test scenarios, which run at least in part, on the software system. As used herein, the terms "associated" and "belongs" may be used interchangeably when referring to a software system being associated with an organization or a software system belonging to an organization.

Some embodiments in this disclosure involve monitoring multiple users belonging to different organizations. In some embodiments, each user belongs to a single organization. For example, 100 different users may belong to 30 different organizations; some organizations may have a single user that belongs to them, while other organizations have multiple users that belong to them. In some embodiments, users may belong to more than one organization. For example, 100 different users may belong to 150 different organizations; in this example, some of the users belong to more than one different organization.

In the embodiments, some of the systems on which test scenarios are run may be data-oriented large-scale software systems. Optionally, the software systems are packaged applications having multiple modules. Optionally the software systems may be considered similar to each other if the software systems use in a similar manner one or more modules of the same type (possibly having different versions). Additionally or alternatively, the software systems may be considered similar if they contain one or more modules with a similar function (e.g., modules that manage sales, stocking, or human resources).

In some embodiments, analyzing runs of test scenarios obtained from monitoring running of test scenarios by a crowd of users, on software systems of multiple organizations, may help gain certain insights that may not be easily attained from analysis obtained from runs associated with a single organization. For example, runs of test scenarios obtained from monitoring a crowd may help gain insight into the general applicability of certain test scenarios and/or test steps for testing certain components of the systems, such as modules, business process, and/or transactions. Based on the fact that multiple organizations run test scenarios to test certain components, it may be postulated that a different organization should also run similar test scenarios; this may be especially true if the different organization is in the same field of operations as the multiple organizations.

In some embodiments, analyzing runs of test scenarios obtained from monitoring running of test scenarios on systems of multiple organizations may also help gain insight into the commonality of certain aspects of the systems, as indicated by their reoccurrence in the runs. Such insight may be used, in some embodiments, to deduce whether a certain aspect is particular to a single organization, or a small number of organizations from the multiple organizations. Alternatively, it may be deduced, the certain aspect may be rather general and may be associated with a relatively large portion of the multiple organizations. For example, runs of test scenarios associated with multiple organizations may include a field which is given a value in each run of the test scenarios. If a certain value is entered in a large proportion of the runs (the same certain value is entered in each run of the large proportion or runs), then the value may be considered a default value or a general value. In this case, knowing the certain value may not assist much to identify a specific organization which is associated with a run from which the certain value was taken. However, if a certain value appears only in runs of a single organization, or in a small proportion of the runs, then the value may be considered a unique and/or proprietary value. In this case, knowing the certain value may assist to identify a specific organization which is associated with a run from which the certain value was taken. Thus, in some embodiments, monitoring runs of test scenarios associated with multiple organizations may help discover non organization-specific default values that can be used for running test scenarios of other organizations. Additionally, the same analysis may help identify what data in the runs may be considered proprietary.

Configuration Elements and Changes

In one embodiment, the software systems may include many modules that can be configured to suit an organization's needs. Configuring a system may involve various aspects of a software system, modules belonging to the software system, and/or business processes run on the software system. Optionally, in some embodiments, configuring a system is done, at least in part, using configuration files, setup file, and/or customization code that are read by the system and may be altered by an organization to suit the organization's needs. In one example, configuring a SAP ERP system involves entering, editing, and/or removing values from configuration tables. Optionally, the tables may define various aspects of fields (e.g., name and type) for certain data tables users may access via the ERP system. In another example, an Oracle™ database system is configured using Oracle form personalization, which is a standard feature provided by Oracle™ and supported by Oracle™ to customize the forms. Forms personalization enables changing properties of fields, such as hiding fields, making fields mandatory, creating zoom functionality, and/or dynamic changes of lists of values. In one embodiment, customizations refer to user-generated code, such as "user exit" in SAP, and customization code in Oracle.

In some embodiments, a configuration element is one or more details (e.g., a line in a configuration file, a field name, a function name), which can be used to configure behavior of a software system. In one example, a configuration element may define certain aspects of data structures used by the system (e.g., column names in a table) and/or type of values in a column belonging to a table. In another example, a configuration element may determine behavior of a system, such as defining what functions should be called under certain conditions (e.g., what to do with a printing job).

In one embodiment, a change to a configuration element may be referred to as a "configuration change". Optionally, a configuration change may include one or more actions that involve adding a configuration element, deleting a configuration element, and/or editing a configuration element. Optionally, a configuration change may require running one or more test scenarios in order to verify that the configuration change caused a desired effect and/or in order to verify that the configuration change did not cause an undesired effect.

In one embodiment, a configuration element may have an associated value. For example, a configuration element called "default field width" may have an associated value 20. Optionally, a change to an associated value of a configuration element may be referred to as a "configuration change". Optionally, a configuration change may involve adding an associated value to a configuration element, deleting an associated value from a configuration element, and/or editing an associated value of a configuration element.

In some embodiments, there may be various ways in which configuration elements and/or configuration changes may be identified. Identifying a configuration element enables a software system and/or a user to determine what configuration element is being referred to. Similarly, identifying a configuration change enables the software system and/or a user to determine what configuration element being changed and/or what change is done to an associated value of the configuration element.

In one example, a configuration change is identified by a code, such as a hash code or an identification number. Optionally, the code also identifies an associated value of the configuration element and/or a change to an associated value of the configuration element. In another example, a configuration change and/or a configuration element may be characterized by a new configuration file (e.g., a new setup file for the system). Optionally, a comparison between a new configuration file and a previous configuration file may characterize configuration changes, that involve changes to configuration elements and/or associated values of configuration elements.

In one embodiment, configuration elements and/or configuration changes may be clustered into clusters of similar configuration elements and/or configuration changes. Optionally, clusters of similar configuration elements include configuration elements that deal with the same, or similar, system modules, business processes and/or database tables. Optionally, clusters of similar configuration changes include configuration changes that deal with the same, or similar, configuration elements. Optionally, clusters of similar configuration changes include configuration changes that are associated with similar values.

In one embodiment, configuration elements and/or configuration changes are clustered utilizing text clustering approaches. For example, clustering is performed on configuration files that include the configuration elements and/or configuration changes. Those skilled in the art may identify various text clustering algorithms that may be utilized to cluster configuration elements into clusters of similar configuration elements. Optionally, configuration elements and/or configuration changes may be considered similar if configuration files that include the configuration elements and/or the configuration changes are considered similar (e.g., they belong to a same cluster).

In another embodiment, clustering configuration elements and/or configuration changes may be done based on values associated with the configuration elements. Optionally, clusters of similar configuration elements and/or configuration changes may include same or similar configuration elements and/or configuration changes, which have similar associated values in several ways. In one example, portions of configuration files that include multiple configuration elements and/or configuration changes are converted to vector representation; each vector dimension corresponds to a certain configuration element and the value entered in the vector dimension corresponds to an associated value of the certain configuration element. Those skilled in the art may recognize various algorithmic approaches that may be utilized to cluster vectors representing the portions of the configuration files (e.g., k-means or hierarchical clustering).

Clustering Runs of Test Scenarios

In some embodiments, runs of test scenarios may be clustered. Clustering the runs may involve assigning a run of a test scenario to at most one cluster (e.g., "hard clustering" or partitioning). Alternatively, the clustering may involve assigning a run of a test scenario to one or more clusters. For example, the clustering may be "soft clustering" in which a run of a test scenario may belong to various clusters, possibly with different probabilities or levels of association to each cluster. Optionally, clusters of runs contain runs that are similar to each other.

In one embodiment, runs of test scenarios may be partitioned into clusters based on one or more values from the runs of test scenarios. For example, runs that involve a same start and/or end test step may be placed in the same cluster (e.g., runs that start from the same screen ID and end with an error are placed in the same cluster). In another example, runs that have a certain field (e.g., customer bank account number) are placed in the same cluster.

Clusters of runs of test scenarios may have different characteristics in different embodiments. In one embodiment, a cluster of runs of test scenarios should be of a size that reaches a predetermined threshold. Optionally, the predetermined threshold is greater than one. For example, each cluster should contain at least 3 runs. Optionally, the predetermined threshold is proportional to the number of runs being clustered. For example, each cluster may be required to contain at least 0.1% of the runs of test scenarios being clustered.

Clusters of runs may also be constrained according to the source of the runs belonging to the clusters. In one embodiment, a cluster of runs of test scenarios must include runs of at least a first predetermined number of different users and/or of users belonging to at least a second predetermined number of organizations. Optionally, the first predetermined number is greater than one and/or the second predetermined number is greater than one. In one example, the first predetermined number is 10, and the second predetermined number is 2; thus, each cluster includes at least 10 runs, and not all those runs are associated with the same organization. In another example, the first predetermined number is 5, and the second predetermined number is 5; thus, each cluster needs to contain runs associated with at least 5 organizations.

In one embodiment, ensuring that clusters of runs have certain characteristics, such as a certain size and/or include runs of a certain source, is done by a clustering algorithm that generates the clusters. For example, the clustering algorithm may ensure that each cluster includes runs of test scenarios of at least a predetermined number of users. Alternatively or additionally, ensuring that clusters of runs have certain characteristics may be done after clustering. For example, after clusters are generated, they may be filtered to remove clusters that have a size that is smaller than a predetermined threshold.

In one embodiment, clustering of runs of test scenarios may involve procedures that rely on some runs being similar based on a criterion of similarity. Optionally, a cluster of runs may include similar runs. Optionally, by similar runs it is meant that two runs are similar to each other according to the criterion. Optionally, by similar runs it is meant that at least a certain percentage of the runs belonging to a cluster are similar to each other according to the criterion. For example, a cluster may be considered to include similar runs if 90% of the pairs of runs in the cluster are similar according to the criterion. Optionally, by similar runs it is meant that runs belonging to the cluster are all similar to a representative of the cluster, such as one of the runs belonging to the cluster or an average run of the cluster (e.g., a centroid of the cluster).

The criterion according to which similarity between runs may be established, may have several forms. For example, the criterion for similarity between runs may be that similar runs include at least one of: essentially the same fields, similar combinations of fields, similar execution of transactions, similar user interactions, similar requests, similar test steps, and/or similar calls to procedures. Optionally, similarity between runs of test scenarios may be determined based on properties of their respective test scenarios of which the runs are instantiations; for example, by comparing the test steps used in each test scenario.

In one example, various runs of essentially the same test scenario (e.g., essentially the same testing script) are considered similar. In another example, runs of different test scenarios (e.g., using slightly different testing scripts), may be considered similar if certain similarity criteria are met (e.g., similar fields types or names, similar field values, similar screen content and/or layout, and/or similar return values in the runs). In yet another example, runs of test scenarios are considered similar, if the test scenarios from which they were instantiated are similar (e.g., involve similar screens, similar fields, and/or similar field values).

In one example, at least part of the runs of test scenarios involve software that runs on remote servers such as cloud-based servers. Monitoring a user running a test scenario may involve monitoring the content of the network traffic, such as information exchanged between an input and/or output device of the user and a cloud-based server. In this example, runs of test scenarios may be considered similar if the network traffic associated with them is similar (e.g., it follows a similar exchange sequence, and/or content of the network traffic is similar).

In one embodiment, clustering runs of test scenarios to clusters that include similar runs may be based on counting the number of similar fields used in corresponding screens that are included in the test scenarios; the larger the number of similar fields in the test scenarios, the more similar the runs of the test scenarios are considered to be. Optionally, fields may be considered similar if they include the same type of data. Additionally or alternatively, fields that have the same values are considered similar to each other. In one example, fields that include both the same type of data and the same values are considered more similar to each other than fields that have the same type of data (but different values).

In one embodiment, a type of data of a field is determined according to the context of the field in the screen. For example, if a field is preceded on a screen by the words "amount" or "sum due", the field is considered to be numerical; while if the field is preceded on a screen by the words "address" or "ship to", it is considered to be a string. Additionally or alternatively, the type of data of a field may be determined according to the features of the data structure representing the data. For example, if the field stores data in a variable that holds integers or floating-point values, the type of data is considered to be numerical. However, if the field stores data in an array, or vector of characters, the data type is considered to be a string. Additionally or alternatively, the type of data of a field may be determined according to meta data associated with a screen or database associated with the field. For example, a description of a column, in a database table which is to receive data from a field may be indicative of the type of data. In another example, meta data tags (e.g., XML tags) associated with a screen may indicate the type of data.

In another embodiment, clustering of runs of test scenarios to clusters that include similar runs of test scenarios may be based on similarity between orders of displaying similar fields in corresponding screens. The closer the order of presentation of similar fields in test scenarios, the more similar runs of the test scenarios are considered to be. In one example, test scenarios are represented, at least in part, as a sequence of field types, and/or fields IDs. The similarity between two runs of test scenarios may be determined to be inversely proportional to the number of editing steps that need to be taken to transform one sequence of identifiers to another ("edit distance"); the lower the edit distance between representations of two runs, the more similar they are considered to be (and so are their corresponding runs).

In yet another embodiment, clustering of runs of test scenarios to clusters that include similar runs may be based, at least is part, on similarity between executed procedures that are described in the runs. For example, the larger the overlap in the corresponding sets of procedures performed by each test scenario, the more similar runs of the test scenarios are considered to be. Optionally, the clustering may be further based on the order of the execution of the procedures; the closer the order of execution of procedures in different test scenarios, the more similar runs of the test scenarios are considered to be. In cases in which test scenarios involve execution of essentially the same procedures in essentially the same order, the similarity between runs of the test scenarios may be considered to be high.

In still another embodiment, the clustering of runs of test scenarios to clusters that include similar runs of test scenarios may be based on transactions described as executed in the runs of the test scenarios. For example, test scenarios may be characterized by the individual commands run by the system as part of the test scenario. Runs of test scenarios in which similar commands are executed may be considered similar for the purpose of clustering. Optionally, a cluster of runs that contains runs that have a certain proportion of common transactions executed in all runs in the cluster is considered a cluster of similar runs. For example, if at least 50% of the transactions involved in each run in a cluster appear in all other runs in the cluster, the cluster is considered to be a cluster of similar runs.

Logged activities related to running test scenarios may also be utilized for the purpose of clustering and/or determining similarity between runs of test scenarios. For example, clustering of runs of test scenarios to clusters that include similar runs may be based on one or more of the following logged activities: a list of users who ran the test scenarios, an analysis of access to a database, messages returned from the executed transactions (e.g., valid, warning, or error messages), fields which returned values in the transactions, and/or procedures utilized by the test scenario (e.g., as identified by logs of run time analysis). The clustering may be done according to there being similarity, involving one or more of the aforementioned logged activities, between test scenarios whose runs are assigned to the same cluster. Optionally, logged activities may be represented as feature values that may be put in a vector corresponding to a run. For example, if a certain activity is performed during a run, a vector corresponding to the run has 1 in a certain position, and otherwise there is a 0 in the certain position.

Similarity of runs of test scenarios may be determined, in some embodiments, according to the test scenarios and/or templates from which the runs were instantiated. Optionally, similarity of the test scenarios and/or templates may define similarity of the runs that were instantiated from the test scenarios and/or templates; thus, runs that were instantiated from similar test scenarios and/or templates are placed in the same clusters (e.g., by the clustering module performing the clustering of the runs). Alternatively, similarity of the test scenarios and/or templates may be used as features that assist in determining similarity of runs.

In one embodiment, runs that were instantiated from the same test scenarios and/or the same templates may be considered similar. Optionally, two test scenarios and/or two templates are considered the same if they involve execution of the same test steps, screens, and/or transactions. In one embodiment, two test steps are considered the same if they perform the same exact task and include the same exact associated data, while in another embodiment the two test steps are considered the same if they perform the same task but possibly involving different associated data. For example, a first test step that involves entering a new product that is a screwdriver (with details relevant to a screwdriver) may be considered in the latter embodiment as being the same as a second test step that involves entering a new product that is a hammer (with details relevant to a hammer); however, according to the former embodiment, the first and second test steps may not be the same. Similarly, screens that include field names and field values may be considered the same in one embodiment if the field names and the field values are the same; in another embodiment, the screens may be considered the same if the field names are the same. The same logic may also be applied to transactions; in some examples transactions may be considered the same if they are completely identical, while other transactions may be considered similar if they include some of the same and/or similar elements (e.g., the transactions involve similar screens).

In another embodiment, similarity of test scenarios and/or templates is determined by comparing and/or counting similar elements in the test scenarios and/or templates. If the number and/or proportion of the similar elements reaches a predetermined threshold, then runs instantiated from the test scenarios and/or templates may be considered similar and placed by clustering in the same cluster of runs. For example, if more than 50% of the screens included in two templates are similar, then runs instantiated from the two templates may be placed by clustering in the same cluster.

In yet another embodiment, test scenarios and/or templates from which runs were instantiated may be utilized to generate feature values, which are used to determine similarity of the runs to each other. For example, a vector of features representing a run may include values extracted from a template and/or test scenario from which the run was instantiated.

Clustering of runs of test scenarios to clusters of similar runs may be based on data associated with the runs. Such data may include data describing conditions under which a run was executed. For example, the data may describe aspects of the system (e.g., data involving modules, hardware, and/or software versions). In another example, such data may pertain to a test runner, such as the role (or assumed role) of the tester in an organization, level of skill of the tester, and/or permissions granted to the tester.

In some embodiments, clustering of runs of test scenarios to clusters of similar runs is done, at least in part, according to descriptions related to the systems on which the test scenarios were run. For example, such descriptions may include configuration elements (e.g., configuration files, customization code and/or setup files). Additionally or alternatively, the descriptions may include configuration changes (e.g., addition, deletion, and/or modifications) to the configuration elements. Thus, for example, runs of test scenarios concerning modules with similar configuration files (e.g., the customization files indicate similar default procedures and/or database accesses) may be placed in the same cluster. In another example, runs of test scenarios executed as a response to similar configuration changes (e.g., as determined by the original and/or changed values involved in the configuration changes), may be placed in the same cluster based on their similar configuration changes.

In some embodiments, runs of test scenarios may be represented as vectors of features that may be converted to numerical values. For example, certain dimensions in the feature vectors may correspond to the presence or absence of certain fields, procedures, test steps, and/or transactions in a test scenario (e.g., a value of '1' is given to a feature if a field has a certain value in the test scenario, and '0' otherwise. Alternatively, a value of '1' is given to a certain feature if a certain procedure is called in the test scenario, and '0' otherwise). In another example, certain dimension in the feature vectors contain values of a certain field from a run (e.g., time, data, or price), or are derived from processing one or more field values (e.g., averaging the delivery time from multiple entries of individual delivery times entered in a screen). In yet another example, certain values in a feature vector are assigned numerical values according to categories to which values from the runs belong. For example, a sale may be categorized as "domestic" or "foreign", and accordingly be given a value of "1" or "2" in the feature vector.

Feature vector representations may be utilized in order to compute a degree of similarity between feature vectors of runs of test scenarios. For example, in cases where the feature vectors contain numerical values (or can be converted to numerical values), the distance similarity between vectors representing test scenarios may be computed using one or more of the following established distance metrics: Euclidean distance of various norms, vector dot product, cosine of angle between vectors, Manhattan distance, Mahalanobis distance, Pearson correlation, and Kullback-Leibler divergence.

In one embodiment, a cluster of similar runs includes runs that are represented by similar vectors. Optionally, similar vectors may be characterized in various ways. In one example, similar vectors are vectors whose average pairwise similarity is above a predetermined threshold (e.g., the threshold may be 0.5). Optionally, the average pairwise similarity is determined by computing the average of the dot product of each pair of vectors. In another example, similar vectors are vectors that are all similar to a certain representative vector; e.g., the vectors all within a sphere of a certain Euclidean distance from the representative.

Those skilled in the art may recognize that various clustering algorithms and/or approaches may be used to cluster runs of test scenarios into clusters that include similar runs of test scenarios. For example, the clustering may be done using hierarchical clustering approaches (e.g., bottom-up or top-down approaches) or using partition-based approached (e.g., k-mean algorithms). In addition, some of the test scenarios may have assigned clusters while others may not. In such a case, a semi-supervised clustering approach may be used such as an Expectation-Maximization (EM) algorithm.

In one embodiment, the clustering of the runs of test scenarios to clusters that include similar runs may be done utilizing a classifier that is trained to assign test scenarios to predetermined classes. Optionally, the classifier is trained on labeled training data that includes training data that includes representations of runs of test scenarios (e.g., feature vectors) and labels corresponding to clusters to which the runs are assigned. If the labels in the training data are assigned according to some (possibly arbitrary) notion of similarity between test scenarios, clusters of test scenarios that have the same label assigned by the classifier are likely to contain runs that are similar according to the notion of similarity.

Optionally, runs of test scenarios are labeled according to the module they involve (e.g., "sales", "human resources", "manufacturing"), the type of activities involved in the scenario (e.g., "accessing database", "data entering", "report generating"), fields in the test scenario (e.g., "customer ID", "part number"), properties of the test scenario (e.g., "fast", "many steps", "expensive", "includes private data"), and/or results of a run of the test scenario (e.g., "ok", "error", "access denied-permissions"). Optionally, labels may be constructed from multiple attributes. For example, a run of a test scenario may be labeled as "involve sales, no private data, access corporate database".

Optionally, labels assigned to runs of test scenarios may be generated and/or assigned manually (e.g., by a tester running a test), and/or automatically, e.g., by a procedure that analyzes a test scenario to detect attributes describing it (e.g., what modules and/or procedures it involves).

Those skilled in the art may recognize that there are many algorithms, and/or machine learning-based approaches, that may be used to train a classifier of runs of test scenarios using labeled training data. For example, some examples of the algorithms that may be used include logistic regression, decision trees, support vector machines, and neural network classifiers.

In some embodiments, clusters of runs of test scenarios may be assigned a cohesion rank that describes how close to each other are runs belonging to the cluster. A cohesion rank of a cluster may describe various aspects related to the closeness of runs of test scenarios belonging to a cluster. In one example, similarity of runs of test scenarios is related to the fields included in the screens of the test scenarios; some of the fields may be common to the screens involved in runs belonging to the cluster, and some may not. The cohesion rank may be proportional to the number of fields that are common in the runs belonging to the cluster (e.g., they belong to at least 50% of the runs in the cluster). The cohesion rank can be between two runs of test scenarios or between groups of runs of test scenarios. Optionally, the cohesion rank may be expressed via cluster metrics such as average distance from the cluster centroid or the ratio between the average radius of a cluster (intra-cluster distance) and the average distance between clusters (inter-cluster distance).

Clusters generated in the embodiments (e.g., clusters of runs of similar test scenarios) may be filtered in various ways. Optionally, the filtering may be done in order to reduce the number of clusters that need to be considered and/or retain clusters with a certain desirable property. Optionally, a test scenario template generated from a filtered cluster and/or representing a filtered cluster is not suggested to a user. Alternatively or additionally, a filtered cluster is not utilized for generating a test scenario template and/or does not have a test scenario template to represent it. Optionally, clusters are filtered according to their size. For example, clusters of runs of test scenarios that contain less than a predetermined number of runs are filtered. Optionally, clusters are filtered according to the number of their associations. For example, runs of test scenarios in a cluster may be associated with certain organizations (e.g., each run may be associated with an organization). Clusters containing runs that are associated with too few different organizations may be considered too homogenous and filtered.

Test Scenario Templates

A test scenario template may include various test steps that need to be performed by a user in order to test certain aspects of a system being tested. Optionally, in some embodiments, a test scenario template may be lacking one or more values that need to be provided in order to run a test scenario based on the test scenario template. In such a case, a user running a test scenario based on the template may be required to enter the one or more values that need to be provided, in order to complete the template of the test scenario; alternatively, the one or more values and be calculated and/or guessed. In one example, a test scenario template may describe a test scenario in which an order process is completed; the template may be lacking a customer name and product ID, and in order to run an instantiation of the template, a user may be required to enter the lacking details. In another example, a template may be of a test scenario in which rush shipping is performed; a screen presented to the user may already have the rush shipping box checked, but the user may still need to add details such the client account number and shipping address.

In one embodiment, a template may include certain values from which a user may be required to choose in order to run a test scenario instantiated from the template. For example, a template may have various values for a discount (e.g., 10%, 20%, or 50%); a user needs to choose from in order to complete a transaction that is part of the template. Optionally, the values the user may need to choose from are derived from one or more runs of test scenarios that were used to generate the template. For example, the aforementioned values of the discount are the most popular values found to be used in runs of test scenarios from which the template was generated.

In some embodiments, one or more runs of test scenarios may be used in order to generate a test scenario template to represent them. Optionally, the test scenario template is generated by a template generator module. In one example, the runs of test scenarios may belong to a cluster. Optionally, the test scenario template may identify, for its corresponding cluster, one or more transactions used by test scenarios belonging to the cluster. Additionally or alternatively, the test scenario template may identify a way of using transactions that are part of the test scenarios whose runs belong to the cluster. For example, a template may define the order of programs that are to be called, the type of actions that are to be taken by a user (e.g., what fields to fill, what buttons to push), and/or provide default values to at least some of the fields (e.g., enter default values to some fields that appear on screens that are part of test scenarios generated from the template). Additionally or alternatively, a test scenario template may identify one or more possible values that may be used to run a transaction identified by the template.

It is to be noted that phrases such as "identifies a transaction" involves any type of transaction identification, such as a transaction identification number, a name of a transaction, a description of a transaction, a screenshot of a transaction, computer code of a transaction, and/or any other method that enables a human and/or a computer to link between a possible value and a transaction. Additionally, identifying a transaction may involve noting a transaction identification. In one example, noting a transaction identification involves storing the transaction identification; for example, a template may store transaction identification numbers that are to be executed when running an instantiation of the template. In another example, noting a transaction identification involves providing the transaction identification. For example, upon a query, scanning a template may generate and/or transmit names of transactions that are stored in it.

Generating the template may involve utilizing information from a plurality of runs of test scenarios. For example, one or more test steps, commands, and/or values may be copied from at least one of the plurality of runs of the test scenarios and placed in the template. Additionally or alternatively, information contained in at least some of the plurality of runs may be analyzed in order to determine certain test steps, commands, and/or values are to be used in the template. Note that not all information in the plurality of run of the test scenario needs to be utilized to generate the test scenario template. For example, a test scenario template may include a proper subset of test steps included in certain runs. In another example, certain runs, such as certain runs in a cluster, may be disregarded when generating a template based on other runs in the same cluster.

In some embodiments, template generation may be based on information obtained from one or more test scenarios. Optionally, instantiations of the one or more test scenarios are runs of test scenarios obtained and/or identified from activity data of users. In one example, a test scenario may include a script comprising test steps, and one or more test steps from the script are included in the template. Note that the script may be one various types of media; for example, a hard copy document (e.g., paper), an electronic document (e.g., a Microsoft Word™ or a PDF document), and/or a list of computer commands (e.g., a script for an automatically run test scenario). In another example, a test scenario may include certain values that may be altered by a user running instantiations of the test scenario (e.g., the certain values may be default values). In this example, to generate the template it may be desirable to utilize a certain value from a test scenario, rather than a user-provided value from a run that is an instantiation of the test scenario.

A test scenario template may be generated based on data coming from several sources. In one embodiment, a template is based on automatic test scenarios (e.g., scripts run automatically by a program without any essential human intervention). Additionally, the template may also be based on the runs of the same test scenario. Thus, certain values in the template may come from the test scenarios, while other values may come from the runs. In another example, a template may be based on runs coming from different organizations. The template may contain certain screens coming from a first organization (e.g., as they appeared in runs associated with the first organization), while other screens in the template may come from runs associated with a second organization.

In one embodiment, a test scenario template is generated from a first run of a test scenario run by a first user and a second run of a test scenario run by a second user belonging to a second organization. Optionally, the first and second runs were obtained from monitoring of the first and second users, respectively. Additionally, the first organization may be different from the second organization and the first user is not the second user. The test scenario template generated from the first and second run identifies a transaction used in the first and second runs and one or more possible values for running the transaction. Optionally, additional runs of test scenarios, besides the first and second runs, are used to generate the test scenario template.

In one embodiment, at least one of the possible values for running a transaction in a template generated from first and second runs may be derived from values obtained from the first and/or second runs. Optionally, the at least one of the possible values for running the transaction does not appear in each of the first and second runs. For example, the at least one of the possible values is an average of a first value from the first run, and a second value form the second run, and the first value does not equal the second value. Optionally, the test scenario template includes a combination of the possible values that may be used to run the test scenario template, and the combination does not appear in any of the first and second runs. For example, a combination of possible values involves fields $f_1$ and $f_2$; the first run has values $v_1$ and $u_1$ for the fields $f_1$ and $f_2$, respectively, and the second run has values $v_2$ and $u_2$ for the fields $f_1$ and $f_2$, respectively. In addition, $v_1$ does not equal $v_2$ and $u_1$ does not equal $u_2$. In this example, if the test scenario template has a value $v_1$ for $f_1$ and $u_2$ for $f_2$, then it contains a combination of possible values that does not appear in any of the first and second runs.

In one embodiment, the first and second runs upon which a template is based, may each be manual, semi-automatic, or automatic runs of test scenarios. In one example, a test scenario template is generated from a first run of a first test scenario which is a manual test scenario and a second run of a second test scenario which is an automatic test scenario. In another example, a test scenario template is generated from a first run of a first test scenario and a second run of a second test scenario, and both the first and second runs are automatic.

In another embodiment, the first test scenario and second test scenario are the same test scenario. Thus, the first run and the second run are instantiations of the same test scenario. In this case, despite being runs of the same test scenario, the first and second runs may be different (e.g., due to different inputs provided by a user during their running). Alternatively, the first test scenario and second test scenario may be different test scenarios. Thus, the first run and the second run are runs of different test scenarios; however, the first and second runs may be similar due to similarities (despite being different) between the first and second test scenarios and/or similarities in inputs provided by the user while running the first and second runs).

In one embodiment, generating a test scenario template involves receiving multiple runs (e.g., runs belonging to a cluster of similar runs), and selecting at least a first run and a second run, from among the multiple runs, upon which the template is to be based. Optionally, the first and second runs are selected such that they belong are runs of different users and/or runs of users belonging to different organizations. Optionally, the first and second runs are runs that exhibit, on average a high similarity to the multiple runs (e.g., they are similar to a cluster centroid). Optionally, the first and second runs are selected such that other of multiple runs have a similarity to either the first run or the second run that reaches a predetermined threshold. Optionally, the first and second runs are selected according to a profile, such as a profile of a certain user. Optionally, the profile indicates transactions and/or values typically utilized by the certain user, and the first and second runs that are selected involve transactions and/or values that appear in the profile.

In one embodiment, generating a test scenario template from a cluster of runs of test scenarios involves identifying a representative run of a test scenario for the cluster, and using the representative run of a test scenario as basis for the at least one template.

In one embodiment, generating a test scenario template from a run of a test scenario may involve utilizing information from the run of the test scenario. For example, one or more test steps, commands, and/or values may be copied from the run and placed in the template. Additionally or alternatively, information contained in the run may be analyzed in order to determine certain test steps, commands, and/or values are to be used in the template. Note that not all information in the run of the test scenario needs to be utilized to generate the test scenario template. For example, the template may include a proper subset of test steps included in the run of the test scenario. Optionally, certain information in the run which may be deemed proprietary is not utilized for the template. Additionally or alternatively, certain information in the run which may be deemed proprietary is removed from the template.

In another embodiment, generating a test scenario template from runs of test scenarios (e.g., the runs belong to a cluster of similar runs of test scenarios), may involve utilizing values of a field, as they appear in runs, in order to set the value of the field in the test scenario template.

In one embodiment, the value for the field in the test scenario template is selected from the values of the field in the runs of test scenarios in the cluster. For example, the value of the field in the template is set according to the value of the field in a randomly selected run of a test scenario from the cluster.

In one embodiment, the value for the field in the test scenario template is generated by a function with one or more parameters that are set according to the values of the field in the runs of test scenarios in the cluster. Optionally, the value generated by the function is not a value found in any of the runs belonging to the cluster. For example, in order to fill the field "age" in the template, a distribution of the values of "age" in runs in the cluster may be learned, and then the value in the template may be set according to the expectation of the learned distribution or randomly drawn according to the distribution. In this example, the resulting value of "age' may not be an actual value that appears in any of the runs belonging to the cluster.

Test scenario templates may be suggested to a user so that the user may run an instantiation of the templates on a system to which the user belongs and/or is associated with. Optionally, a template may be generated from one or more runs of test scenarios associated with various organizations to which the user does not belong.

In some embodiments, a user is suggested to run a test scenario template by presenting the user with a suggestion on a user interface. For example, the user interface may be a screen (e.g., monitor, image projected on a screen, and/or augmented/virtual reality display). In another example, the user interface may involve a speaker. Optionally, the user may interact with a system via the user interface in various ways; for example, touch (e.g., via a touch screen), typing (e.g., on a physical and/or virtual keyboard), a hand-operated control device (e.g., a mouse), and/or voice commands. Optionally, the user is given an opportunity to modify via the user interface, data related to the instantiation and presented on the user interface; for example, the user may modify default values, set according to the template, and presented on a screen that is presenting while running an instantiation of the template. Optionally, the user interface may initiate an instantiation of a test scenario template; for example, the user interface may present a first screen of the test scenario template and prompt the user to take a certain action to advance execution of the template.

In one embodiment, a user is recorded while running a certain test scenario. If it is identified that the certain test scenario is similar to a test scenario template (e.g., the certain test scenario involves similar test steps, transactions, and/or values as those involved in the template), it may be suggested to the user to run an instantiation of the test scenario template. Optionally, a suggestion to the user to run an instantiation of the template is made via a user interface.

In another embodiment, a profile of a user is utilized to suggest to the user to run a test scenario template appropriate to the user based on information included in the profile. In one example, the profile may include various information regarding the user and/or an organization to which the user belongs, such as information regarding modules, business processes, and/or transaction utilized by the user and/or organization. In another example, the profile may include runs of the user and/or users belonging to a certain organization, and/or data derived from the runs. In addition to the profile, and/or instead of it, the suggestion of a template to the user may be done according to other factors such as coverage of templates, importance of templates, ranking of templates, and/or connectivity factors of templates, as described in more detail below.

Coverage

In order to validate that certain system elements operate correctly after installation, customization, a change, and/or an upgrade is done to the system—it is often the case that many test scenarios need to be run. In order to validate the system's performance, it is desirable that the test scenarios that are run should cover many elements that may be related to, and/or affected by, the installation, customization, change, and/or upgrade. For example, the elements may include various transactions that may exhibit undesired behavior due to the certain configuration change and/or upgrade; each executed test scenario may be able to be used to test a subset of the transactions that are likely to be affected by the change, and/or update, in order to determine if unwanted system behavior occurs that involves one or more transactions. Therefore, the coverage offered by a set of test scenarios (or test scenario templates), such as which modules, business processes, and/or transactions are evaluated by running a set of test scenarios, becomes an important consideration when selecting which test scenarios to run. Ideally, it would be desirable to obtain as large coverage as possible with test scenarios, however, often restrictions stemming from limited resources for running test scenarios have also to be taken into account.

In one embodiment, coverage refers to a percent of business processes, used by an organization, that are sufficiently tested by test scenarios in relation to the total number of business processes used by an organization or a certain user. For example, if 40% of the business processes run by users of an organization are sufficiently tested by certain test scenarios, then the coverage of the certain test scenarios is 40%. In some cases in order for a module, business process, and/or transaction to be sufficiently tested, more than one aspect of the module, business process, and/or organization needs to be tested. This may involve running multiple tests in order to cover the more than one aspect. For example, different combinations of input data for the same screen need to be provided in order to test various aspects of a certain business process.

In one embodiment, a required coverage for a certain user that runs test scenarios, is received and utilized for suggesting test scenario templates for the user. For example, the required coverage may list certain transactions that need to be evaluated with test scenarios run by the user, and optionally the number of test scenarios that need to be run to evaluate at least some of the transactions. Alternatively or additionally, the required coverage may indicate what percentage of a system's transactions need to be evaluated by the test scenarios. In another example, the required coverage may indicate which business processes, screens, and/or specific fields need to be evaluated by running test scenario.

In one embodiment, achieving a required coverage is done by evaluating a large number of test scenario templates and estimating coverage achieved by individual templates and/or subsets of templates. Following the evaluation, a subset of templates that includes at least one template is suggested to the user in order to achieve the required coverage. Optionally, the suggested subset that includes at least one template is a subset with an essentially minimal number of templates and/or involves performing an essentially minimal number of test steps. It is to be noted that by an "essentially minimal" number it is meant a number close to the absolute minimal possible, for example up to 10% more than the absolute minimum. In some cases, the absolute minimal number of templates may be determined by an exhaustive evaluation of all possible subsets of templates; however, this may prove intractable if a large number of templates are involved.

In one embodiment, calculating the required coverage for a certain user is based on a usage information of a certain user. For example, by analyzing the usage information a list may be prepared of certain modules, business processes, and/or transactions the user frequently utilizes. This list can then be used to guide a search for a certain subset of test scenario templates that tests aspects of items on the list which need to be tested.

Finding a minimal sized subset of template obtaining a desired coverage need not require exhaustive search in every case. Those skilled in the art may recognize that there are structured methods for evaluating a search space of subsets of templates such as branch-and-bound approaches, or A* searches that enable finding the essentially minimal subset without necessarily evaluating all subsets of templates. In addition heuristic search methods may be used, such as simulated annealing, genetic algorithms, and/or random walks in order to quickly find subsets with a small number of templates (but not necessarily minimal). Additionally, optimization algorithms that involve constraint satisfaction may be used to efficiently find an essentially minimal subset.

In one embodiment, a goal of a search for a subset of templates that achieves a certain coverage is to find a subset of templates, which involves a minimal amount of testing time on the user's part. Achieving the required coverage for the certain user involving the shortest testing time for the user may be done by estimating time to achieve a required coverage for the certain user by many templates (e.g., in a search performed in the space of possible subsets of templates). And after evaluating the time it takes to run each of the many templates and/or subsets of templates, suggesting the certain use utilize a subset that includes at least one of the templates, that both achieves the required coverage and requires an essentially minimal time to complete. In this case, the suggested templates are likely to be templates relevant to scenarios that are expected to be used by the certain user, and are likely to be spread to approximately achieve a uniform coverage of the scenarios with the suggested templates.

In some cases, it is useful to refer to a coverage of a test scenario template with respect to a test scenario. In one embodiment, a template is said to cover a certain test scenario if it involves essentially the same test steps as the test scenario. Additionally or alternatively, coverage of a template with respects to a test scenario may be the percentage of test steps of the test scenario that are included in the template. Similarly coverage of a subset of templates with respect to a test scenario may refer to the test steps in the test scenario that are included in at least one of the templates in the subset.

Importance of a test scenario for a certain user may also be an objective that guides the suggestion of a template to the certain user. In one embodiment, test scenario templates that cover a test scenario are estimated to be important are suggested to the certain user before other templates that are estimated to be less important.

There are various ways in which importance of a test scenario may be evaluated. In one example, the importance of a certain test scenario is determined by frequency in which the certain test scenario is used relative to frequency in which other test scenarios are used. Thus, a test scenario often run by the certain user may be deemed significantly more important than a test scenario rarely run by the certain user. In another example, importance of a certain test scenario is determined by characteristics of users that run the certain test scenario, compared to characteristics of users that run other test scenarios. For instance, if a certain test scenario is run primarily by users that hold high positions in an organization's hierarchy, it is likely that the certain test scenario is more important than another test scenario that is used primarily by users on the lower rungs of the organization's hierarchy. In yet another example, importance of a certain test scenario is determined by a financial value associated with the certain test scenario compared to a financial value associated with other test scenarios. For example, a test scenario that involves retaining an unsatisfied customer may be given a high financial value for the organization compared to another transaction which involves sending customers a notice that their order is still pending.

Profile of a User

A profile of a user may include data related to the user, an organization to which the user belongs, and/or activity of the user on a software systems, such as software systems associated with the organization. Optionally, at least some of the data in a profile may be considered proprietary data. Optionally, the proprietary data may identify details regarding the user and/or an organization related to the profile, such as an organization to which the user belongs. In one example, a profile may include proprietary data about the user (e.g., age, address, languages, skills), and/or proprietary data related to a role of the user in the organization (e.g., job title, placement of user in organizational chart, and/or permissions and/or privileges of the user). In another example, the profile may include proprietary data related to the organization to which the user belongs (e.g., field of operation, name and sizes of departments, products and/or services provided by the organization, permissions and/or accounts of the organization, and/or customers and/or suppliers of the organization). In yet another example, proprietary data included in a profile of a user may be indicative of activity of the user. In this example, the activity may have been previously observed and/or recorded (e.g., by monitoring of the user). Additionally or alternatively, the activity may be predicted based on characteristics of an organization to which the user belongs, the position the user holds in the organization, and/or other attributes of the user (e.g., permissions and/or accounts of the user).

In one embodiment, a profile of a user includes data that is indicative of test scenarios relevant to the user and/or templates of test scenarios relevant to the user. For example, the profile may include attributes such as modules used by the user, transactions used by the user (e.g., identifiers of transactions and the number of times they were executed), and/or characteristics derived from activity of the user (e.g., accesses to databases, quantities of network data generated, reports generated by the user). Optionally, a profile of a user may include runs of test scenarios of the user, and/or results of a summary and/or analysis of runs of test scenarios of the user. For example, the profile may include a list of the transactions that are executed often in runs of test scenarios of the user. Optionally, a profile of a user may include information indicative of test scenario templates utilized by a user (e.g., templates which the user ran instantiations of).

A profile of a user may be used in order to suggest to the user to utilize a certain test scenario template. Optionally, the template may be selected from among one or more test scenario templates generated from clusters of runs of test scenarios. For example, given a profile that indicates that a user performs many transactions involving database updates, the system may recommend for the user a template generated from a cluster that contains runs of test scenarios that involve database updates. In another example, if the profile of a user contains samples of runs of test scenario run by the user, the system may suggest to the user to use a template generated from a cluster that contains test scenarios that are similar to a test scenario from which a run in the profile was instantiated. In yet another example, a profile includes state information regarding an organization to which a user belongs, such as the time zone and location of a certain site. This information may be used to suggest a certain template for a user testing a software system at the site. For example, a template that involves a report of a vacation of a user in advance may be relevant to an organization site located in France, but not for a site in the US (where such a practice may not be typically required).

In one embodiment, a profile of a user includes permissions of a user. For example, if a profile indicates that a user has permission to approve vacations, the user may be suggested to run a test scenario instantiated from a template that includes such a task. However, if the user does not have such a permission, then the certain template is irrelevant for the user. In another example, a profile describes a position of the user in the organization hierarchy. In this example, a first user may belong to the marketing department, and thus has permission to enter a new potential client in to the system. A second user may belong to the sales department, and thus can send an offer to a client. Thus, based on the profiles of the users, the system may suggest relevant templates for the users: to the first user a template that involves entering client data, and to the second user a template that involves making an offer to a client, and not vice versa.

In some embodiments, a profile may belong to an organization. For example, it may describe a generic user belonging to the organization. Optionally, a profile of an organization may be utilized to perform initial filtering of test scenario templates for users belonging to the organization. For example, according to a profile of an organization, the organization may not be authorized to run a test scenario instantiated from a certain template (e.g., due to lack of permission). This may make the template irrelevant for each and every user belonging to the organization. However, if the organization is authorized to run an instantiation of the test scenario template, according to the profile of the organization, then a profile of an individual user belonging to the organization may need to be checked in order to determine if the template is relevant to the individual user (e.g., to check whether the user has permission to run a test scenario instantiated from the template). In another example, a profile may indicate a method in which the organization conducts business. For instance, the profile may indicate a policy of making payments for goods. Thus, if the profile indicates that the organization always pays after receiving goods, a template that describes advanced payment for goods is not relevant for any user in that organization.

In one embodiment, a profile of a user may include usage data of an organization to which a user belongs. For example, the profile may describe which modules are relevant to organization. Based on the profile, a user will be suggested templates that are relevant to the organization. Similarly, the profile may describe actions that users belonging to the organization may have permission to perform. For example, if users of an organization are not authorized to access a certain database, a user belonging to the organization will not be provided with a template that includes an access to the certain database.

In some embodiments, a profile of a user and/or an organization may represent usage of transactions by the user and/or users belonging to the organization. Optionally, a profile that represents usage of transactions may be represented in various ways. The profile may include a list of runs of test scenarios, clusters of runs, and/or transactions utilized by the user. Optionally, the usage data may be represented as a vector in which each dimension may correspond to a certain transaction, cluster of runs, and/or template. In one example, if a user utilized a transaction, a value of the vector in a corresponding dimension is 1, otherwise it is 0. In another example, a value of a dimension in the vector that corresponds to a certain cluster of runs is set according to the number of runs in the cluster that were run by the user. Thus, the more the user used transactions with corresponding runs in the certain cluster, the higher the corresponding value in the vector.

Having a vector representation for at least some of the values in a profile makes it easier, in some embodiments, to compare between profiles (e.g., to find similar vectors representing similar profiles of users). Additionally, vector representation of profiles may make it easier to perform mathematical operations, such as vector dot-product or matrix factorization.

A profile of a user may be utilized to customize a test scenario template for the user. For example, by filtering the test scenario template in order for it to be more appropriate for the user. In one embodiment, a profile of the user may be used to determine which test steps, from among the test steps described in a test scenario template, are relevant for the user, and optionally remove test steps that are irrelevant. For example, a profile of the user may indicate that the user does not confirm shipments. A test scenario template, suggested to the user may include several test steps that culminate with a test step involving confirming shipment. In such a case, the last test step may be removed in order to make the test scenario template more appropriate for the user. In one example, a template may include values related to international shipping; however, if the profile of the user indicates that the user runs transactions that only involve domestic shipping, certain values concerning international aspects of the transactions may be removed from the template (e.g., destination country, currency conversion rates). In another example, a template that includes a transaction that is part of an employee evaluation process may include values related managerial assessment of the employee. If the profile of the user indicates that the user is not a manager, then those details may be irrelevant for the user. In this case, the user may receive a template that only includes transactions in which self assessment of the employee are performed. In another embodiment, a profile of the user may be used to determine which values utilized in a test scenario template may be appropriate for the user. Optionally, values deemed irrelevant to the user may be removed from the test scenario template suggested to the user. Optionally, the user may be requested to provide relevant values instead of the removed irrelevant values. For example, a profile of a user may indicate that the user deals exclusively with domestic customers having domestic addresses. However, a test scenario template may include default values that correspond to foreign addresses. In such a case, the foreign addresses may be removed, and the user may be requested to provide examples of domestic addresses.

Cleaning Proprietary Data

In one embodiment, a test scenario template generated from one or more runs of test scenarios does not include proprietary data captured during the stage of monitoring users that ran the test scenarios. Optionally, the one or more runs of test scenarios belong to a cluster and the test scenario template is generated as a representative of the cluster.

In one embodiment, determination of whether certain data, which appears in a run of a test scenario and/or is obtained from processing data from the run, is proprietary data is based on the repetitiveness of the data in runs of test scenarios. For example, if a certain value appears in only a small proportion of the runs, in runs of a small number of users, and/or runs associated with a small number of organizations, the certain value may be considered proprietary. Conversely, if a certain value is the same in many runs, or in runs of at least a certain proportion and/or number of the users, and/or is associated with at least a certain proportion and/or number of organizations, that value may be considered to be non-proprietary. Optionally, a predetermined proportion is used as a threshold to determine if a certain value is proprietary or not. For example, if a number of different users which ran runs of test scenarios that included the certain value is less than the predetermined threshold, the value is considered proprietary for those users who had runs that included the value. Otherwise, it may be considered non-proprietary (since many users had the value in one of their runs). It is to be noted, that "predetermined" refers to both a fixed value known a priori (e.g., a threshold of 10 users) and/or a value derived from known logic (e.g., 10% of the users).

In one embodiment, data for which one or more of the following is true may be considered proprietary data associated with an organization and/or proprietary data belonging to the organization: the data describes an aspect of the organization and/or a user belonging to the organization; the data appears in a database of the organization; the data appears in a run of a test scenario associated with the organization and/or is derived from the run; and/or the data is generated by a software system associated with the organization. For example, any data on a server belonging to an organization may be considered proprietary data associated with the organization. In another example, any data derived from analysis of runs of test scenarios associated with an organization may be considered proprietary data of the organization. Additionally or alternatively, data for which one or more of the following is true may be considered proprietary data of user and/or proprietary data belonging to the user: the data describes an aspect of a user; the data describes an organization to which the user belongs; the data appears in a database of the user; and/or the data appears in a run of a test scenario run by the user.

It is to be noted that as used herein, a phrase like "proprietary data" may refer to proprietary data of an organization and/or proprietary data of a user. Additionally, phrases like "proprietary values" and "proprietary data" may be used interchangeably in this disclosure.

In one example, proprietary values are removed from a test scenario template generated from a certain cluster (i.e., one or more runs belonging to the certain cluster were utilized to generate the template). Optionally, the proprietary values are removed by a data cleaner module that operates on the generated template. Additionally or alternatively, removal of proprietary data may be done by other modules belonging to the system, such as a template generator, a customization module, a ranking module, and/or a user interface. Optionally, removing the proprietary values involves selecting a value from the template, and removing the selected value from the template if the selected value appears in less than a first predetermined number of runs of test scenarios in the certain cluster. Additionally or alternatively, the selected value may be removed if it appears in runs belonging to the certain cluster that are associated with less than a second predetermined number of different organizations. In this example, both the first predetermined number and the second predetermined number are greater than one. Optionally, the first predetermined number and/or the second predetermined number are proportional to the number of user with runs belonging to the certain cluster and/or the number of organizations associated with runs belonging to the certain cluster. For example, the first predetermined number may be set to be the maximum of two and 10% of the users with runs in the certain cluster.

Determining whether data is proprietary may utilize a profile of a user and/or a profile of an organization. For example, any data that appears in a profile of a user and/or an organization may be considered proprietary and thus not allowed to be included in a template. In another embodiment, the profile may indicate certain data is proprietary (e.g., by placing it a an exclusion list which prohibits utilization of the data in templates).

In one embodiment, testing whether certain data is proprietary is done by querying a database (e.g., a database that contains samples of proprietary data). Additionally or alternatively, the certain data may be submitted to a procedure that evaluates the data to determine whether the data is likely to be proprietary. For example, the procedure may perform semantic and/or syntactic analysis of the data to check whether the certain data has a certain meaning and/or contains certain patterns that indicate that it is likely to be proprietary. For example, the procedure may scan the certain data for strings like "bank account", "address", and/or "social security number".

In another embodiment, a user may provide feedback on certain data which indicates whether the certain data is proprietary. For example, the user may review values of data fields prior to running a test scenario and indicate which values the user considers proprietary. Additionally or alternatively, while a test scenario is running, the user may mark certain data as proprietary (e.g., data the user considers should not be seen by the user or other users). Optionally, the user may provide feedback the certain data via a user interface on which the user is running the test scenario.

In yet another embodiment, determining whether a certain value may be proprietary may be assisted by noting the source, location, and/or data structure that contains the certain value. For example, in certain systems, a value that appears in a checkbox on a screen is likely to be a default value of the system, and thus not likely to be proprietary. However, free text fields on screens are more likely to contain data entered by a user, and are thus likely to be proprietary. In a another example, in which the certain value appears in a drop-down menu in a screen, it might be necessary to determine from the context whether values in the drop-down menu are proprietary or not. Additionally, certain systems may be built in such a way that makes it relatively easy to determine which data is proprietary and which is not. For example, in SAP ERP meta data, which typically includes general (non-proprietary) data, is clearly marked.

In one embodiment, a value in a test scenario template that is considered proprietary is removed from the template. Optionally, the proprietary data is removed by a data cleaner module, a template generator module, a customization module, and/or another module and/or combination of modules. In one example, a value may be deleted from a template; consequently, the template may contain an indication of missing data (corresponding to the deleted value); prior to running a test scenario based on the template and/or during the run of the test scenario, the missing data needs to be provided (e.g., the user is prompted to provide it). Alternatively, a value in a test scenario template that is considered proprietary may be removed from the template by replacing it with a default or "dummy" value.

In one embodiment, proprietary data is not included in a template. For example, a module generating a template and/or a module customizing a template, check whether certain values are proprietary (e.g., by checking whether a certain flag related to the certain values is raised, or by submitting the certain values to a procedure for evaluation). If the certain values are deemed to be proprietary, they are not included in the template.

Proprietary data may be removed from runs of test scenarios at different stages. In one embodiment, the proprietary data is removed from runs of test scenarios as the runs are recorded and/or identified. For example, a "scrubbed" version of runs, which does not contain certain proprietary data, may be the data that is provided to components of the system (e.g., a clustering module and/or template generator). Optionally, determining what proprietary data is may relate to general statistics (e.g., utilization of certain elements and/or values by a certain proportion of organizations).

In another embodiment, proprietary data is removed from runs after clustering of the runs is performed. Optionally, determining what data in the runs should be considered proprietary utilizes the fact that after clustering, clusters contain similar runs. In one example, the fact that runs belong to clusters may enable the identification of certain values that are shared by many runs (which may indicate that the certain values are not proprietary), or shared by a few runs (which may indicate that the certain values are proprietary).

In some embodiments, test scenario templates are generated from one or more runs of test scenarios belonging to a certain cluster. Optionally, the templates are generated in such a way that they are not likely to include data that may be easily traced to specific runs in the certain cluster, users that ran runs belonging to the certain cluster, and/or organizations associated with runs belonging to the certain cluster. In these embodiments, generating a template may involve selecting a value from a run of a test scenario belonging to the certain cluster, checking whether the value appears in at least a first predetermined number of the runs in the certain cluster; checking whether the value appears in runs in the certain cluster that are associated with at least a second predetermined number of different organizations; and if both conditions are positive, enabling the test scenario template to utilize the selected value. Optionally, if at least one of the conditions is negative the test scenario template is not allowed to utilize the selected value.

In one embodiment, removing proprietary data from a test scenario template generated from one or more runs of test scenarios involves removing most output fields from the runs. Consequently, most of the information generated in the runs may be removed. In one example, most of the information output in the runs is considered proprietary, and is therefore removed. Optionally, as a result of removing most of the output fields, the test scenario template does not include expected values for most test steps. Optionally, running an instantiation of the test scenario template may require a user to provide values in most of the test steps.

Customizing a Test Scenario Template

Test scenario templates generated from runs of test scenarios of users belonging to different organizations may not be ideal for a certain user from a certain organization. For example, the templates may include information such as values that do not suite the certain user and/or the certain organization, and/or include certain test steps that are irrelevant for the certain user and/or the certain organization. It therefore may be beneficial to customize test scenario templates for a certain user and/or a certain organization. Optionally, customizing a test scenario template may be done as part of generating the template (e.g., by the template generator), by another module such as a customization module, or a combination of modules.

In some embodiments, customizing a test scenario template involves adding to the test scenario template one or more values that are relevant to a certain user and/or a certain organization. Optionally, the one or more values that are added replace existing values in the template that may be less appropriate for the certain user and/or the certain organization. Optionally, at least some of the values added to the template by the customizing replace proprietary data that has been removed from the template (e.g., by a data cleaner module).

In some embodiments, customizing a test scenario template is done using proprietary data related to a certain user and/or a certain organization. The proprietary data may be directly related to the certain user and/or the certain organization, such as internal organizational data of the certain user and/or the certain organization, and/or data obtained by monitoring the certain user and/or users belonging to the certain organization. Additionally or alternatively, the proprietary data may be of a different user and/or different organization, and based on similarity to the certain user and/or certain organization the proprietary data is assumed to be useful for customizing the template.

Proprietary data used to customize a test scenario template may have various sources. In one embodiment, proprietary data relevant to a certain user, for whom a test scenario template is customized, is obtained by providing the test scenario template to a different user, prompting the different user to provide a missing value, and recording an input value provided by the different user. Alternatively, the same process may be performed with the certain user, i.e., the test scenario template is provided to the certain user, the certain user is prompted to provide a value, and the value provided by the certain user.

In another embodiment, the proprietary data relevant to the certain user for whom the test scenario template is customized is obtained by guiding a user to provide the proprietary data while semiautomatically executing an instantiation of the test scenario template. Optionally, the user providing the proprietary data is the certain user. Providing proprietary data via semiautomatic execution may involve filling a value into a field missing a value in an instantiation of the test scenario template. This may be done by selecting a value from a database related to the certain user and testing whether the selected value is congruous with the field. If the selected value is congruous with the field, filling the field with the selected value. Otherwise, prompting the first user to provide a value for the field missing a value. Optionally, selecting the value utilizes a heuristics-based algorithm that is run on data from multiple organizations. For example, the selection of the value may be based in part on determining how often the value is used by other organizations. Additionally or alternatively, providing proprietary data via semiautomatic execution may involve filling a value into a field missing a value in an instantiation of the test scenario template by identifying users similar to the certain user. Following that, selecting a value from runs of test scenarios of the users similar to the certain user and then testing whether the selected value is congruous with the field. If the selected value is congruous with the field, the field may be filled with the selected value. Otherwise, the certain user may be prompted to provide a value for the field missing a value.

In one embodiment, proprietary data relevant to a certain user, for whom a test scenario template is customized, is obtained by marking locations of values that were removed from the test scenario template, and directing attention of a user to provide data appropriate for the marked locations. Optionally, the user is the certain user for whom the template is customized. Optionally, the values removed from the test scenario template were removed by a data cleaner module.

One source of proprietary data useful for customizing a test scenario template for a certain user may be a profile of the certain user. For example, such a profile may be provided to a module that performs customization of the template. Data in the profile, such as proprietary information related to the user and/or the organization may be inserted into the template. For example, a profile of the certain user may include the user's name, address, job title, and/or employee number; these values may be inserted in their appropriate positions in a customized template in order to save the certain user the time and effort of inserting them when running an instantiation of the template. In another example, the profile of the certain user may include a list of customers the user works with, parts the user frequently orders, and/or contact information of clients the user frequently interacts with. These values may be automatically inserted into a template in order to customize it and make it more relevant to the certain user.

In one embodiment, a profile of a user that is used to customize a test scenario template is a profile of a generic user of an organization. In this case, customizing the template may utilize information that does not identify a specific user. For example, to customize a template the system may use activity data from the profile such as a list of modules that are frequently run, but not use data such as an employee name of a real employee.

Another source of proprietary data useful for customizing a test scenario template for a certain user may be a data generator related to the certain user and/or a certain organization to which the certain user belongs. For example, the data generator may be a program that extracts values from a database related to the certain organization. The database may hold "real world" information such as actual customer orders, which can be used to generate tests that are more relevant.

In one embodiment, customizing a test scenario template for a first user utilizes a customization module and involves obtaining proprietary data relevant to the first user and substituting a non-empty subset of proprietary data removed from the template with the obtained data. Optionally, the obtained data undergoes processing prior to being entered into the template.

In one example, the proprietary data relevant to the first user is obtained from a previously monitored run of test scenario associated with the first user; for instance, the run of the test scenario may have been run by the first user, run by a user associated to an organization to which the first user belongs, and/or a user with a similar organizational role as the first user (e.g., both users are sales managers).

In another example, the proprietary data relevant to the first user is obtained from parsing a manual test scenario associated with the first user in order to obtain a value associated with the first user. For example, the manual test scenario may be a script for running a test that is intended to be used by the first user, a user associated to an organization to which the first user belongs, and/or a user with a similar organizational role as the first user. After obtaining the value associated with the first user, a non-empty subset of the removed proprietary data from the template is substituted with the obtained value.

In yet another example, the proprietary data relevant to the first user is obtained from analyzing a database of the software system associated with the first user to obtain a value associated with the first user. The database may include data on and/or be accessed by the first user, a user associated to an organization to which the first user belongs, and/or a user with a similar organizational role as the first user. After obtaining the value associated with the first user, a non-empty subset of the removed proprietary data from the template is substituted with the obtained value.

In one embodiment, the customization module is also configured to: provide the customized test scenario template to a second user, prompt the second user to provide a missing value, and record an input value provided by the second user. Optionally, the first user and the second user are the same user.

Values used for customization of templates may be obtained, in some embodiments, by exploiting wisdom of the crowd. This "wisdom" may be gained by analyzing runs of users from different organization in order to find certain patterns and common values. In one example, many organizations have a dummy customer entry for testing; for example, a customer named "test". Thus, entering "test" as a user is likely to allow a test scenario to run, so a customization module may try using the customer "test" in a template being customized. In another example, SAP catalog numbers usually start from 1000, and 1000 usually describes a catalog number for tests and not a real number. Thus, when customizing a template, if a catalog number is needed, the value 1000 may be tried. In both of these examples, the knowledge of which default values may be gained by examining runs of users from different organizations. This allows a customization module to discover from the crowd certain values that may not be apparent to whomever is customizing the template.

In embodiments described in this disclosure, after generating a test scenario template from one or more runs of test scenarios (e.g., using a template generator), the template might undergo further processing such as removal of proprietary data, customization, ranking, and/or the template may be suggested to the user. Optionally, the one or more runs of test scenarios belong to a certain cluster of similar runs of test scenarios. FIG. 8A to FIG. 8G illustrate some, but not all, combinations of system modules that may be used in embodiments described in this disclosure to process the template and/or suggest the template to a user.

Figure 8A:
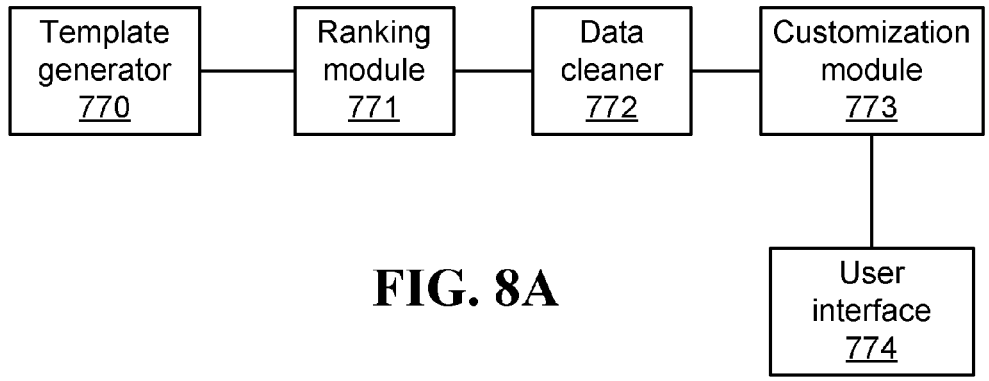
FIG. 8A illustrates a combination of system modules that may be used in embodiments described in this disclosure.

FIG. 8A illustrates a combination of system modules that may be used in embodiments in which a template generator 770 generates a test scenario template from one or more runs of test scenarios. The template is provided to a ranking module 771 that may rank the template, for example, by assigning it a score proportional to its relevancy to a certain user. Optionally, the ranking module 771 receives a profile of a certain user and/or a certain organization and utilizes data from the profile, in order to rank the template. Following that, a data cleaner 772 receives the template and may remove proprietary data from the template. Optionally, the data cleaner 772 receives a profile related to a certain user and/or a certain organization, and utilizes the profile to remove certain proprietary data from the template. After removing proprietary data from the template, the template from which proprietary was removed is provided to a customization module 773 that customizes the template by adding certain data to the template. Optionally, the customization module 773 receives a profile of a certain user and/or a certain organization and adds data from the profile, which relevant to the certain user and/or organization, to the template. The customized template from which proprietary data was removed is then provided to a user interface 774. Optionally, the user interface 774 presents to a user a suggestion to run an instantiation of the customized template from which proprietary data was first removed.

It is to be noted that in this disclosure, though modules may be illustrated in figures as separate elements, in some embodiments, they may be implemented as a single element that performs the functionality of modules. For example, the software module that implements the template generator 770 may also perform the tasks of the data cleaner 772. In another example, the customization module 773 and the data cleaner 772 are realized by the same software programs.

Figure 8B:
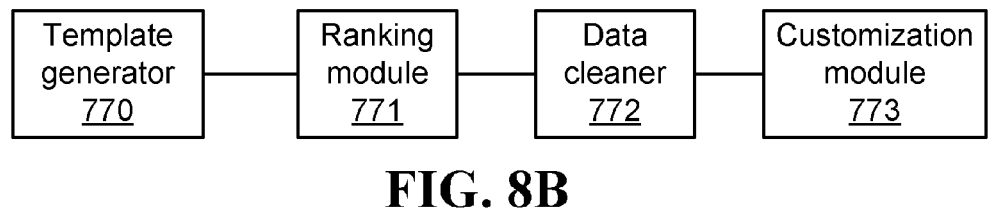
FIG. 8B illustrates a combination of system modules that may be used in embodiments described in this disclosure.

In other embodiments, after being processed by various modules, a template generated by the template generator need not be provided to a user interface. For example, it may be stored in the system for further use. FIG. 8B illustrates a similar portion of a system to the system illustrated in FIG. 8A, however in this system after being subjected to ranking, removal of proprietary data, and customization, a template is not presented to a user via a user interface.

Figure 8C:
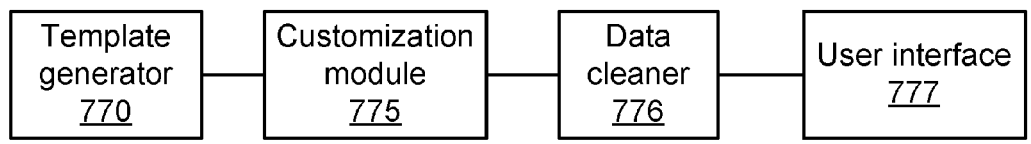
FIG. 8C illustrates a combination of system modules that may be used in embodiments described in this disclosure.
Figure 8D:
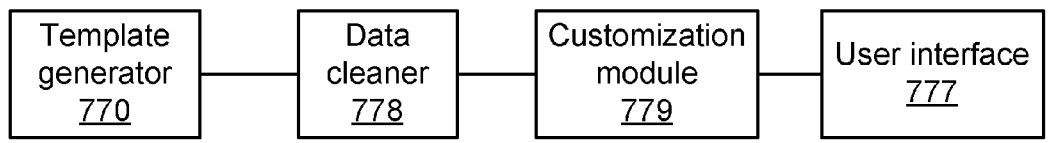
FIG. 8D illustrates a combination of system modules that may be used in embodiments described in this disclosure.

The order in which a template may undergo processing by system modules may differ between embodiments. For example, FIG. 8C illustrates a combination of system modules which includes the template generator 770 which provides a template for customization by a customization module 775. Following the customization, a data cleaner 776 removes proprietary data from the template. The template is then provided to a user interface 777, for example, in order to be suggested to a user. FIG. 8D illustrates a similar system, however in it a template generated by the template generator 770 is first provided to a data cleaner 778. After removing proprietary data from the template, the template is provided to a customization module 779. The customized template may then be presented to a user via the user interface 777.

Figure 8E:
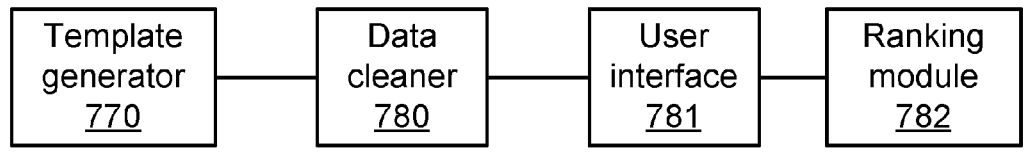
FIG. 8E illustrates a combination of system modules that may be used in embodiments described in this disclosure.
Figure 8F:
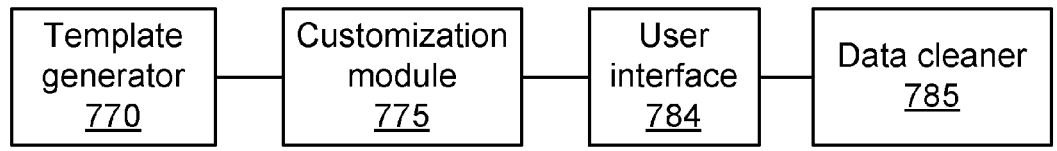
FIG. 8F illustrates a combination of system modules that may be used in embodiments described in this disclosure.

In some embodiments, a user interface is not necessarily used to suggest templates to a user; it may be utilized by other system modules to perform their task. FIG. 8E illustrates a combination of system modules that may be utilized in embodiments, in which a ranking module 782 and a data cleaner 780 interact with a user interface 781. For example, the data cleaner 780 may present a template generated by the template generator 770 to a user on the user interface 781, in order for the user to mark and/or approve certain proprietary data the data cleaner found in the template. Additionally, the ranking module 782 may present a ranking of the template in order for the user to verify the ranking and/or edit it. Optionally, the user may then determine what is to be done with the template (e.g., should the user run it, save it for later, and/or discard it). FIG. 8F illustrates a combination of system modules that may be utilized in embodiments, in which a customization module 775 utilizes a user interface to perform customization of a template. For example, data that was added to a template generated by the template generator 770 is presented to a user on a user interface 784 for approval and/or editing. Following that, the template may be subjected to removal of proprietary data by a data cleaner 785. For example, the proprietary data may be added by the user via the user interface 784.

Figure 8G:
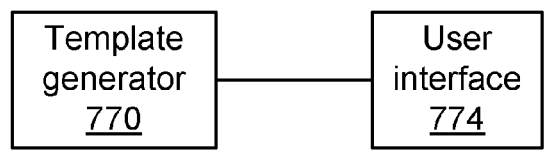
FIG. 8G illustrates one embodiment of sending the template generator to a user interface.

In some embodiments, a template that is generated by a template generator does not undergo additional processing by system modules. For example, as illustrated in FIG. 8G, after being generated by the template generator 770, the template may be sent to the user interface 774 (e.g., to be suggested to a user).

While some of the above embodiments may be described in the general context of program components that execute in conjunction with an application program that runs on an operating system on a computer, which may be a personal computer, those skilled in the art will recognize that aspects may also be implemented in combination with other program components. Program components may include routines, programs, modules, data structures, and other types of structures that perform particular tasks or implement particular abstract data types. Moreover, the embodiments may be practiced with other computer system configurations, such as: cloud computing, a client-server model, grid computing, peer-to-peer, hand-held devices, multiprocessor systems, microprocessor-based systems, programmable consumer electronics, minicomputers, and/or mainframe computers. The embodiments may also be practiced in a distributed computing environment where tasks are performed by remote processing devices that are linked through a communication network. In a distributed computing environment, program components may be located in both local and remote computing and/or storage devices. Some of the embodiments may also be practiced in the form of a service, such as infrastructure as a service (IaaS), platform as a service (PaaS), software as a service (SaaS), and/or network as a service (NaaS).

Embodiments may be implemented as a computer implemented method, a computer system, and/or as a non-transitory computer-readable medium. The non-transitory computer-readable medium comprises program code which provides, or participates in providing, instructions to a processor. The non-transitory computer-readable medium may be implemented, for example, via one or more of a volatile computer memory, a non-volatile memory, a hard drive, a flash drive, a magnetic data storage, an optical data storage, and/or any other type of a tangible computer memory to be invented that is not transitory signals per se. The program code may be updated and/or downloaded to the non-transitory computer-readable medium via a communication network such as the Internet.

Herein, a predetermined value, such as a predetermined threshold, may be a fixed value and/or a value determined any time before performing a calculation that compares a certain value with the predetermined value. A value may also be considered to be a predetermined value when the logic, used to determine whether a threshold that utilizes the value is reached, is known before start of performing computations to determine whether the threshold is reached.

In this description, references to "one embodiment" mean that the feature being referred to may be included in at least one embodiment of the invention. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment.

The embodiments of the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and therefore may not necessarily correspond to discrete hardware elements.

While the methods disclosed herein have been described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments. Accordingly, this disclosure is intended to embrace all such alternatives, modifications, and variations that fall within the spirit and scope of the appended claims and their equivalents.

What is claimed is:

1. A computer system comprising:
a module analyzer configured to receive: a first description of a first set of vendor-customized packaged application modules, and a second description of a second set of vendor-customized packaged application modules; wherein a first organization utilizes the first set of modules, a second organization utilizes the second set of modules, and the first organization has a different composition of shareholders than the second organization; and wherein the first description comprises customizations to modules belonging to the first set and the second description comprises customizations to modules belonging to the second set;
the module analyzer is further configured to identify, based on the first and second descriptions, a first customization to a first instance of a certain module and a second customization to a second instance of the certain module; wherein the first and second instances belongs to the first and second sets, respectively; and wherein the first customization is similar to the second customization;

a component analyzer configured to identify, based on the first and second customizations, components in the second instance that are similar to components in the first instance;

a template generator configured to receive: first and second runs of a test scenario run to test the second instance, and a description of similar components comprising an indication of at least one component of the second instance that is similar to at least one component of the first instance;

the template generator is further configured to generate, based on the first and second runs, and the description of similar components, a test scenario template for testing the first instance; wherein the test scenario template identifies a first transaction executed in the first run and a second transaction executed in the second run, wherein the second transaction is different from the first transaction; and a data cleaner configured to remove from the test scenario template proprietary data associated with the second organization.

2. The computer system of claim 1, wherein a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

3. The computer system of claim 2, wherein the first customization and the second customization are similar by virtue of at least one of: a similar business process being described in the first and second customizations, a similar transaction being described in the first and second customizations, a similar field on a screen used by a certain transaction being described in the first and second customizations, a certain value used by a certain transaction being described in the first and second customizations, and a certain command described in the first and second customizations.

4. The computer system of claim 1, wherein the template generator is further configured to select the first and second runs of a test scenario run to test the second instance from a plurality of runs of test scenarios that were run to test the second instance.

5. The computer system of claim 1, wherein the first organization and the second organization are associated with different fields of operation.

6. The computer system of claim 1, further comprising a user interface configured to suggest to a user to run an instantiation of the test scenario template.

7. A computer implemented method comprising:

receiving a first description of a first set of instances vendor-customized packaged application modules; wherein a first organization uses the first set and the first description comprises customizations to modules from the first set;

receiving a second description of a second set of instances vendor-customized packaged application modules; wherein a second organization uses the second set and the second description comprises customizations to modules from the second set; and wherein the first organization has a different composition of shareholders than the second organization;

identifying, based on the first and second descriptions, a first customization to a first instance of a certain module and a second customization to a second instance of the certain module; wherein the first and second instances belongs to the first and second sets, respectively; and wherein the first customization is similar to the second customization;

identifying, based on the first and second customizations, components in the second instance that are similar to components in the first instance;

receiving first and second runs of a test scenario run to test the second instance, and a description of similar components comprising an indication of at least one component of the second instance that is similar to at least one component of the first instance;

generating, based on the first and second runs, and the description of similar components, a test scenario template for testing the first instance; wherein the test scenario template identifies a first transaction executed in the first run and a second transaction executed in the second run, which is different from the first transaction; and removing from the test scenario template proprietary data associated with the second organization.

8. The computer implemented method of claim 7, wherein the second set includes at least one module that is not included in the first set.

9. The computer implemented method of claim 7, wherein a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

10. The computer implemented method of claim 9, wherein the first customization and the second customization are similar by virtue of at least one of: a similar business process being described in the first and second customizations, a similar transaction being described in the first and second customizations, a similar field on a screen used by a certain transaction being described in the first and second customizations, a certain value used by a certain transaction being described in the first and second customizations, and a certain command described in the first and second customizations.

11. The computer implemented method of claim 7, wherein the first organization and the second organization are associated with different fields of operation.

12. The computer implemented method of claim 7, further comprising selecting the first and second runs of a test scenario run to test the second instance from a plurality of runs of test scenarios that were run to test the second instance.

13. The computer implemented method of claim 7, wherein the test scenario template comprises possible values for running the first and second transactions.

14. The computer implemented method of claim 13, wherein at least one of the possible values for running the first transaction does not appear in each of the first and second runs of the specific test scenario.

15. The computer implemented method of claim 13, wherein the test scenario template includes a combination of the possible values, and the combination does not appear in any of the first and second runs.

16. The computer implemented method of claim 7, further comprising suggesting to a certain user to run an instantiation of the test scenario template.

17. A non-transitory computer-readable medium for use in a computer to generate generating a test scenario template from data collected from users running test scenarios to test vendor-customized packaged application modules; the computer comprises a processor, and the non-transitory computer-readable medium comprising:
- program code for receiving a first description of a first set of instances vendor-customized packaged application modules; wherein a first organization uses the first set and the first description comprises customizations to modules from the first set;
- program code for receiving a second description of a second set of instances vendor-customized packaged application modules; wherein a second organization uses the second set and the second description comprises customizations to modules from the second set; and wherein the first organization has a different composition of shareholders than the second organization;
- program code for identifying, based on the first and second descriptions, a first customization to a first instance of a certain module and a second customization to a second instance of the certain module; wherein the first and second instances belongs to the first and second sets, respectively; and wherein the first customization is similar to the second customization;
- program code for identifying, based on the first and second customizations, components in the second instance that are similar to components in the first instance;
- program code for receiving first and second runs of a test scenario run to test the second instance, and a description of similar components comprising an indication of at least one component of the second instance that is similar to at least one component of the first instance;
- program code for generating, based on the first and second runs, and the description of similar components, a test scenario template for testing the first instance; wherein the test scenario template identifies a first transaction executed in the first run and a second transaction executed in the second run, which is different from the first transaction; and
- program code for removing from the test scenario template proprietary data associated with the second organization.

18. The non-transitory computer-readable medium of claim 17, wherein the second set includes at least one module that is not included in the first set.

19. The non-transitory computer-readable medium of claim 17, wherein a component of a customization of a module involves one or more of the following: a certain business process run on the module, a certain transaction run on the module, a certain field on a screen used by a certain transaction run on the module, a certain value used by a certain transaction run on the module, and a certain command executed when running the module.

20. The non-transitory computer-readable medium of claim 17, further comprising program code for customizing the test scenario template for the first organization.

* * * * *